(12) United States Patent
Monaldo

(10) Patent No.: US 12,417,758 B1
(45) Date of Patent: Sep. 16, 2025

(54) AUTOMATED DICTATION CORRECTION TECHNOLOGY

(71) Applicant: Tyler Joseph Monaldo, Odenton, MD (US)

(72) Inventor: Tyler Joseph Monaldo, Odenton, MD (US)

( * ) Notice: Subject to any disclaimer, the term of this patent is extended or adjusted under 35 U.S.C. 154(b) by 0 days.

(21) Appl. No.: 19/011,876

(22) Filed: Jan. 7, 2025

(51) Int. Cl.
*G10L 15/01* (2013.01)
*G10L 15/22* (2006.01)
*G10L 15/26* (2006.01)

(52) U.S. Cl.
CPC .............. *G10L 15/01* (2013.01); *G10L 15/26* (2013.01); *G10L 2015/225* (2013.01)

(58) Field of Classification Search
CPC .... G10L 15/01; G10L 15/26; G10L 2015/225
See application file for complete search history.

(56) References Cited

U.S. PATENT DOCUMENTS

| | | | | |
|---|---|---|---|---|
| 9,336,689 | B2 * | 5/2016 | Romriell | G06F 40/232 |
| 10,331,713 | B1 * | 6/2019 | Chahal | G06F 16/335 |
| 10,468,016 | B2 * | 11/2019 | Jaramillo | G10L 15/26 |
| 10,643,609 | B1 * | 5/2020 | Pogue | G10L 15/18 |
| 11,211,058 | B1 * | 12/2021 | Eakin | G10L 15/197 |
| 11,823,659 | B2 * | 11/2023 | Reinspach | G10L 15/01 |
| 2007/0118374 | A1 * | 5/2007 | Wise | G10L 21/06 |
| | | | | 704/235 |
| 2008/0114597 | A1 * | 5/2008 | Karpov | G10L 15/22 |
| | | | | 704/E15.04 |
| 2010/0070908 | A1 * | 3/2010 | Mori | G06F 3/04886 |
| | | | | 715/764 |
| 2011/0137653 | A1 * | 6/2011 | Ljolje | G10L 15/183 |
| | | | | 704/E15.001 |
| 2012/0223889 | A1 * | 9/2012 | Medlock | G06F 40/274 |
| | | | | 345/173 |

(Continued)

FOREIGN PATENT DOCUMENTS

| | | | |
|---|---|---|---|
| CN | 119227640 A | * | 12/2024 |
| CN | 119227647 A | * | 12/2024 |

(Continued)

OTHER PUBLICATIONS

Sun, Hanbo, et al. "HTEC: Human Transcription Error Correction." arXiv preprint arXiv:2309.10089. (Year: 2020).*

(Continued)

*Primary Examiner* — Paras D Shah
*Assistant Examiner* — Oluwadamilola M Ogunbiyi

(57) ABSTRACT

Automated dictation correction technology, in which voice input of one or more sentences spoken by a user is captured by a microphone and converted to text data representing the one or more sentences. The text data is displayed on a user interface and a text correction of a first portion of the text data is entered by the user. Based on receipt of the text correction of the first portion of the text data, the text data is analyzed to assess similarity of the first portion of the text data to other portions of the text data. Based on the assessment, the system determines that an additional correction of a second portion of the text data is recommended. Based on the determination that the additional correction is recommended, the system performs an operation related to automated correction of the second portion of the text data.

20 Claims, 9 Drawing Sheets

(56) References Cited

U.S. PATENT DOCUMENTS

| | | | |
|---|---|---|---|
| 2013/0298084 A1* | 11/2013 | Spivack | H04L 65/403 |
| | | | 705/14.67 |
| 2014/0129331 A1* | 5/2014 | Spivack | G06Q 30/0255 |
| | | | 705/14.53 |
| 2014/0278400 A1* | 9/2014 | Coussemaeker | G06F 16/248 |
| | | | 704/235 |
| 2014/0297267 A1* | 10/2014 | Spencer | G06F 3/04886 |
| | | | 704/9 |
| 2015/0006170 A1* | 1/2015 | Caskey | G09B 19/06 |
| | | | 704/235 |
| 2015/0046435 A1* | 2/2015 | Donneau-Golencer | |
| | | | G06F 16/9032 |
| | | | 707/766 |
| 2016/0239259 A1* | 8/2016 | Lenchner | G10L 15/1822 |
| 2016/0364397 A1* | 12/2016 | Lindner | H04L 65/764 |
| 2017/0201613 A1* | 7/2017 | Engelke | G10L 15/01 |
| 2018/0032533 A1* | 2/2018 | Singh | H04L 67/025 |
| 2018/0034961 A1* | 2/2018 | Engelke | H04M 1/2475 |
| 2019/0095738 A1* | 3/2019 | Sharma | G06T 7/11 |
| 2019/0312973 A1* | 10/2019 | Engelke | G10L 15/183 |
| 2019/0370251 A1* | 12/2019 | Li | G06F 16/29 |
| 2020/0160866 A1* | 5/2020 | Szymanski | G06N 3/02 |
| 2020/0243094 A1* | 7/2020 | Thomson | G10L 15/28 |
| 2020/0321007 A1* | 10/2020 | Stoker | G10L 15/26 |
| 2020/0335100 A1* | 10/2020 | Saon | G10L 15/22 |
| 2020/0410991 A1* | 12/2020 | Jost | G10L 15/22 |
| 2021/0074277 A1* | 3/2021 | Lewis | G10L 15/22 |
| 2021/0142789 A1* | 5/2021 | Gurbani | G10L 15/26 |
| 2021/0236731 A1* | 8/2021 | Mazlish | A61M 5/1407 |
| 2021/0266473 A1* | 8/2021 | Engelke | G06F 40/169 |
| 2021/0390957 A1* | 12/2021 | Wexler | G10L 15/26 |
| 2022/0059095 A1* | 2/2022 | Faria | G10L 15/183 |
| 2022/0103683 A1* | 3/2022 | Engelke | H04M 3/42391 |
| 2022/0237217 A1* | 7/2022 | Widdows | G06F 40/284 |
| 2023/0068878 A1* | 3/2023 | Dwivedi | G06F 18/2148 |
| 2023/0168813 A1* | 6/2023 | Bueb | G06F 3/0619 |
| 2023/0267926 A1* | 8/2023 | Padfield | G10L 15/02 |
| | | | 704/235 |
| 2023/0326460 A1* | 10/2023 | Sikora | G10L 15/1822 |
| | | | 704/235 |
| 2023/0360652 A1* | 11/2023 | Li | G10L 15/02 |
| 2024/0105160 A1* | 3/2024 | Kim | G10L 13/08 |
| 2024/0311579 A1* | 9/2024 | Dong | G06F 40/284 |
| 2024/0412723 A1* | 12/2024 | Kim | G10L 15/26 |
| 2025/0095302 A1* | 3/2025 | Wetmore | G06F 3/017 |

FOREIGN PATENT DOCUMENTS

| | | | | |
|---|---|---|---|---|
| DE | 10040214 B4 | * | 3/2006 | G10L 15/183 |
| KR | 20250025701 A | * | 2/2025 | G10L 15/30 |
| WO | WO-2017217046 A1 | * | 12/2017 | G06F 3/16 |

OTHER PUBLICATIONS

Leng, Yichong, et al. "Fastcorrect: Fast error correction with edit alignment for automatic speech recognition." Advances in Neural Information Processing Systems 34 (2021): 21708-21719. (Year: 2021).*

Leng, Yichong, et al. "Softcorrect: Error correction with soft detection for automatic speech recognition." proceedings of the AAAI conference on artificial intelligence. vol. 37. No. 11. 2023. (Year: 2023).*

* cited by examiner

600

| Automated Correction Action | Correction Probability Score |
|---|---|
| Automatic Correction | 95-100 |
| Automatic Correction With Highlight | 85-94 |
| Suggest Correction With "Correct All" Option | 75-84 |
| Suggest Correction with Single Option to Correct | 65-74 |
| Suggest Correction with Multiple Options | 50-64 |
| Highlight Text With Indication That Original Text Being Maintained | 30-49 |
| No Action | 0-29 |

FIG. 6

AUTOMATED DICTATION CORRECTION TECHNOLOGY

TECHNICAL FIELD

This disclosure relates to automated dictation correction technology.

BACKGROUND

Electronic devices provide dictation functionality in various ways. For example, electronic devices provide speech to text conversion for electronic messaging. Electronic devices also allow speech to text conversion for taking notes and generating content for electronic documents.

SUMMARY

Techniques are described for automated dictation correction. For example, a mobile device may receive voice input of one or more sentences spoken by a user and captured by a microphone. The mobile device converts the received voice input of the one or more sentences to text data representing the one or more sentences and causes display, on a user interface, of the text data representing the one or more sentences converted from the received voice input. Subsequent to display, on the user interface, of the text data representing the one or more sentences, the mobile device receives a text correction of a first portion of the text data representing the one or more sentences. The text correction is entered by the user through the user interface and results in a change from the first portion of the text data to corrected text within the one or more sentences displayed on the user interface. Based on receipt of the text correction of the first portion of the text data, the mobile device analyzes the text data representing the one or more sentences to assess similarity of the first portion of the text data to other portions of the text data representing the one or more sentences. Based on the assessment of the similarity of the first portion of the text data to other portions of the text data representing the one or more sentences, the mobile device determines that an additional correction of a second portion of the text data representing the one or more sentences is recommended. The second portion of the text data represents a different part of the one or more sentences than the first portion of the text data. Based on the determination that the additional correction of the second portion of the text data representing the one or more sentences is recommended, the mobile device performs an operation related to automated correction of the second portion of the text data representing the one or more sentences.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

FIG. 6 illustrates an example table that relates automated correction actions to correction probability scores.

DETAILED DESCRIPTION

Although speech to text conversion has improved in recent years, speech to text processes still make mistakes, particularly when a person speaks with an accent, speaks in a noisy environment, or uses acronyms or words that are not commonly found in the dictionary used for the speech to text processing. When mistakes are made, the user manually corrects them by providing user input to an interface that displays the converted text. This is inconvenient for the user, and it would be desirable to provide an automated process of correcting text that a user has dictated using an electronic device.

For example, when a user makes a correction to converted text, the electronic device may analyze other portions of the converted text to see whether similar mistakes were made in the speech to text conversion process. If the electronic device finds similar mistakes, the electronic device performs an operation directed to automatically correcting those mistakes. The operation may involve automatically correcting the mistakes in the same manner the user did for the first instance of the mistake or providing a recommendation to make the same correction to the subsequent mistake. By automatically making the correction or providing the recommendation, the electronic device makes it quicker and easier for the user to correct all errors in the speech to text conversion process.

Figure 1A:
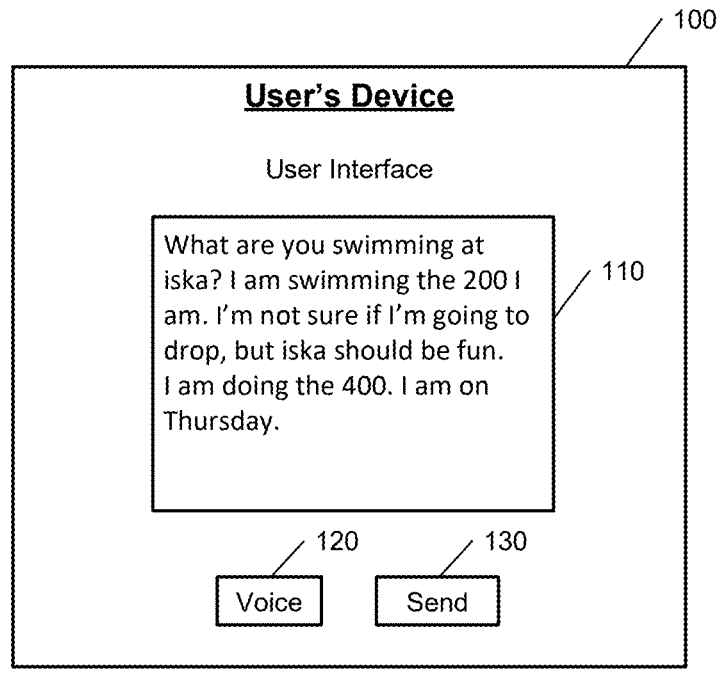
FIGS. 1A-1F illustrate examples of a user device performing automated dictation correction.

FIGS. 1A-1F illustrate examples of a user device performing automated dictation correction. As shown in FIG. 1A, a user device 100 (e.g., cellular phone, tablet, computer, etc.) includes a display 110, a voice input button 120, and a send button 130. In this example, the user device 100 is providing a text messaging interface that allows a user to enter text messages to send to a contact. A user may interact with the display 110, which comprises a touchscreen, to manually input text to the text messaging interface. The user also may use the voice input button 120 to initiate a process by which the user device 100 captures voice input using a microphone and converts it to text that is displayed on the display 110. The send button 130 causes the text displayed on the display 110 to be sent as a text message to another user (e.g., a friend, family member, professional contact, etc.).

In the example shown in FIG. 1A, the user has provided voice input of several sentences that have been converted to text and presented on the display 110. The user can review the converted text to determine whether the speech to text conversion process accurately converted the user's voice input to the text the user intended to send. If the text is correct, the user can use the send button 130 to send the text as a text message.

However, if the text is incorrect, the user can use the touchscreen of the display 110 to enter a text correction. The text correction may change a portion of the displayed text to other text that matches the user's intent for the text message. For instance, the user may delete part of the text and replace it with different text that matches the user's original intent or reflects a user's update to the text when perceiving it as a written text message. In the latter case, the text correction may serve as an enhancement to voice input correctly converted by the user device 100 and can be considered a correction of the voice input provided by the user. By automatically propagating the enhancement correction (or suggesting its propagation), the user device 100 may more efficiently process user input and generate text that represents the user's desired text message.

Figure 1B:
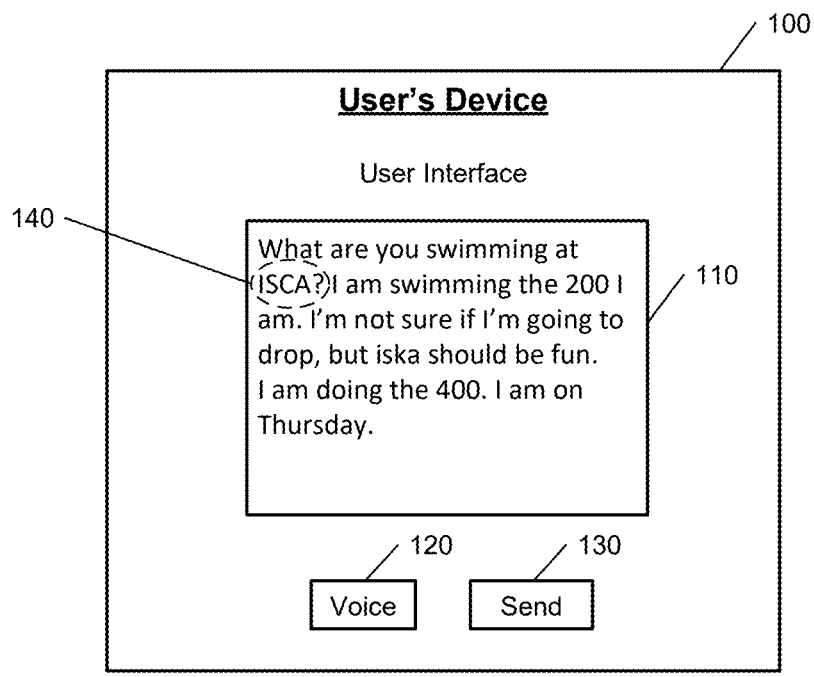

FIG. 1B shows an example of a text correction 140 entered by the user. As shown in FIG. 1B, the user has deleted the text "iska" and replaced it with the text "ISCA." The user made this change because the acronym "ISCA" is the proper acronym for the swim meet the user is referencing in the text message. Because the speech to text conversion process was unfamiliar with the appropriate acronym, the speech to text conversion process incorrectly converted the speech to the term "iska" and the user had to correct it. Based on receipt of the text correction 140, the user device 100 performs operations related to automatic dictation correction. These operations may include operations that relate to correcting text that has already been converted from voice input and/or operations that relate to correcting text that will be converted from future voice input. For example, in terms of correction of previous speech to text conversion, the user device 100 may automatically scan other converted text to check whether the same mistake was likely made in converting the same term spoken by the user in providing voice input and/or may reprocess the prior voice input with the text correction 140 as an input to the speech to text conversion process. In terms of correction of future speech to text conversion, the user device 100 may add the term "ISCA" to a dictionary used in speech to text conversion for the user, track the correction as an input to a speech to text conversion process used for future voice input, and/or apply the correction to a machine learning process that in used to update a language model that is used in speech to text conversion. By updating the text conversion process, the user device 100 may enhance the efficiency and accuracy of automated speech to text conversion for future voice input provided by the user.

Figure 1C:
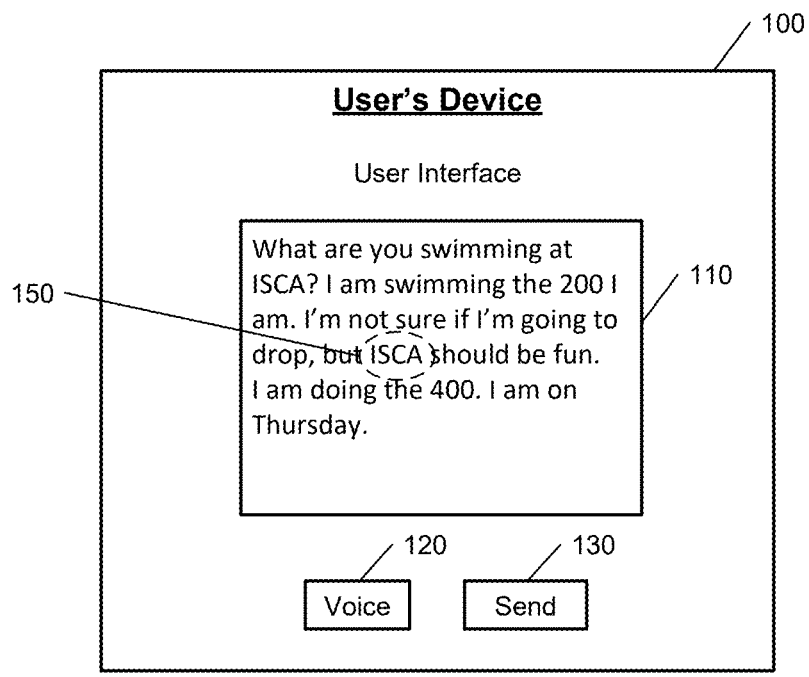

FIG. 1C shows an example of an automatic correction of previously converted text based on the text correction 140 shown in FIG. 1B. As shown in FIG. 1C, based on the text correction 140, the user device 100 has automatically compared the text "iska" to the other text presented on the display 110 that was converted from voice input the user provided to the microphone of the user device 100. As part of the comparison, the user device 100 identified one instance of a direct match to the term "iska" that was manually corrected by the user in the text correction 140 shown in FIG. 1B. Because the user device 100 identified a direct match, the user device 100 automatically applied the correction entered by the user to the earlier text "iska" and made an automatic correction 150 that changed the text "iska" to the text "ISCA" without any further user input beyond the user input provided to implement the initial text correction 140. By automatically making the subsequent correction, the user device 100 has processed the user input more efficiently and saved the time needed to receive user input that manually makes the subsequent correction. The user device 100 may highlight or otherwise indicate to the user that the automatic text correction 150 occurred to ensure the automatic correction was correct and something the user desires. The user device 100 also may have performed automatic correction of the text, rather than automatically making a correction suggestion or taking another automated correction action, because the text "iska" is a direct match to the previously-corrected text and is not a common word (or similar to a common word) that the user could have intended. In other words, because the user device 100 determined that it is highly likely that the user intended to use the acronym "ISCA" based on the provided speech and the text correction 140 made by the user, the user device 100 determined that automatic correction was an appropriate corrective action.

Figure 1D:
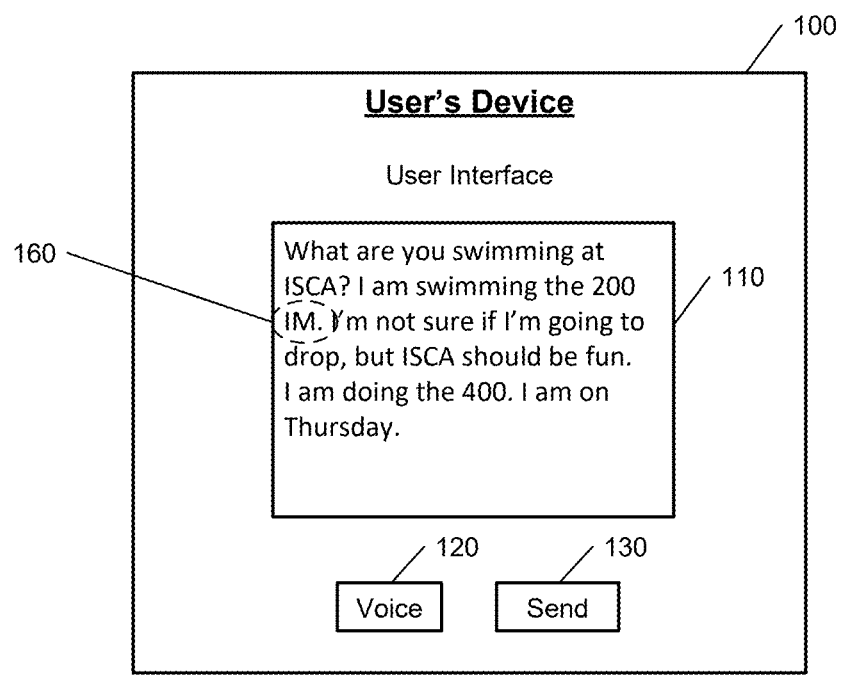

FIG. 1D illustrates an example of a second text correction 160 made to the converted speech shown on the display 110. As shown by a comparison of FIG. 1C and FIG. 1D, the user device 100 incorrectly converted the user's speech to the text "200 I am." To correct the converted speech to the desired text, the user inputted the second text correction 160 to change the text "200 I am" to the intended text of "200 IM," which uses the acronym "IM" to refer to the individual medley swimming race. Because "IM" sounds like the common text "I am," the speech to text conversion process incorrectly converted the user's intended speech of "IM" to the common phrase "I am."

Based on receipt of the second text correction 160, the user device 100 initiates a process to perform automated text correction to determine whether the same (or a similar) error in speech to text conversion was made in other portions of the text shown on the display 110. In this example, the user device 100 determines to perform a more complex automated text correction process than the process described above with respect to FIGS. 1A-1C for the term "ISCA." Specifically, the user device 100 determines that the text "IM" is close to the common text "I am" and it is more likely that the user intended to use the text "I am" in the user's speech, as compared to the likelihood that the user intended to use the text "iska," which is not similar to a common word, in the first example of automated text correction shown in FIGS. 1A-1C. By selecting between multiple automated text correction processes based on how likely the corrected text was intended in other portions of the user's speech, the user device may achieve more efficient and accurate automated text correction.

Various types of automated text correction processes may be selected by the user device 100. For instance, the user device 100 may select from among a first process that automatically corrects text, a second process that suggests corrective actions, a third process that accounts for similarity of the corrected text to other portions of converted text, a fourth process that reassesses the speech input using the text correction as an input, a fifth process that accounts for context related to the text correction, and/or additional automated text correction processes that include a combination of the attributes described above for the first through fifth automated text correction processes. In the examples shown in FIGS. 1A-1D, the user device 100 selects a first process that automatically corrects text for the first text correction 140 because the user device 100 determines that the text "iska" is not within a threshold of similarity to another common set of one or more words in the English language (e.g., in the dictionary or language model used in speech to text conversion). In contrast, the user device 100 selects a second process that suggests corrective actions and considers context for the second text correction 160 because the user device 100 determines that the text "I am" is within a threshold of similarity to another common set of one or more words in the English language (e.g., in the dictionary or language model used in speech to text conversion). In some implementations, the user device 100 need not select a particular automated text conversion process and, instead, may use the same process to evaluate all text corrections, such as a process that considers various factors and various actions to tailor automated text correction appropriately for each correction made and each portion of converted text.

Figure 1E:
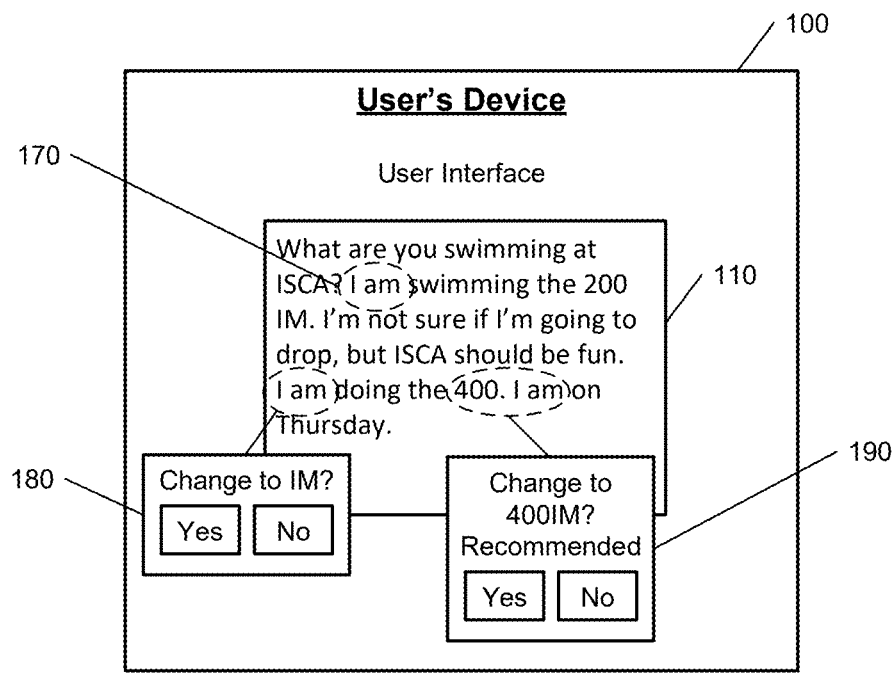

As shown in FIG. 1E, based on receipt of the second text correction 160, the user device 100 selects and performs an automated text correction process that suggests corrective actions and considers context. For example, as shown in FIG. 1E, the user device 100 evaluates text 170 ("I am") and determines not to suggest a corrective action. In this example, although the text "I am" identified by numeral 170 exactly matches the text associated with the second text correction 160, the user device 100 determines to maintain the text 170 and determines not to suggest a correction based on the context related to the text 170. In this regard, part of the contextual analysis relates to the text 170 being located prior to the text subject to the second text correction 160. Although the user device 100 still analyzes text prior to the second text correction 160 (e.g., because the user may have started editing from the latter part of the converted text or because the user may have missed a prior error in the speech to text conversion process), the user device 100 requires a higher threshold to suggest a correction to prior text because the process presumes that the user read the prior text and intentionally did not enter a correction because the converted text was accurate. In this case, the user device 100 also considers surrounding text as part of the contextual analysis. In the second text correction 160, the words "I am" were preceded by the numerical value "200," which is common when referring to an individual medley swimming event. Because the "I am" text 170 is not preceded by a numerical value and corresponds to the commonly used phrase "I am," the user device 100 determines that it is less likely that the "I am" text 170 requires correction. Based on the context (e.g., the text 170 coming prior to the second text correction 160, the text 170 not following a numerical value, and the text 170 being related to a commonly used phrase), the user device 100 determines that the text 170 was most likely converted correctly and determines not to suggest a corrective action for the text 170. By withholding the suggestion for the text 170, the user device 100 performs a more efficient automated text correction process that avoids user attention/input where the speech to text conversion was more likely to have been accurate.

After determining not to suggest a corrective action for the text 170, the user device 100 continues to evaluate additional portions of the text shown on the display 110. For example, the user device 100 analyzes the text "I am" that follows the second text correction 160. In this example, although the text "I am" is the same as the text "I am" shown at reference numeral 170, the user device 100 determines to present an interface 180 that allows for corrective action based on the different context for the text "I am" at this portion of the converted speech. Specifically, in this case and unlike the text 170, the text "I am" follows the second text correction 160 and, thus, the user device 100 presumes that it has not been reviewed by the user. Because the text "I am" exactly matches the second text correction 160, the user device 100 determines to present an interface 180 that presents a corrective active (i.e., change to IM?) and enables the user to easily provide input to accept (i.e., selection of the Yes button) or reject (i.e., selection of the No button) the corrective action.

The user device 100 also analyzes the text "400. I am" that follows the second text correction 160. In this example, although the text "400. I am" is different than the corrected text of "200 I am" (e.g., a different numerical value and a period between the numerical value and the text "I am"), the user device 100 determines to present an interface 190 that recommends corrective action based on the different context for the text "400. I am" at this portion of the converted speech. Specifically, in this case, the user device 100 determines that the context indicates that the text "400. I am" follows the second text correction 160, that the text has a numerical value that precedes the text "I am," and that the sentence following the text "400. I am" (i.e., "I am on Thursday.") is grammatically incorrect. With this context, the user device 100 determines that a recommendation to take the corrective action of changing the text to "400 IM" is appropriate and presents the interface 190 to recommend the correction. The interface 190 is similar to the interface 180, but different in that the interface 190 recommends the corrective action, whereas the interface 180 simply presents the corrective action. The user device 100 determined to recommend the corrective action in the interface 190 because the context related to the text "400. I am" suggested that corrective action is more likely appropriate for that text as compared to the text "I am" associated with the interface 180. By evaluating context, the user device 100 more efficiently processes the user input provided to adjust converted text entered through a speech to text conversion process.

Figure 1F:
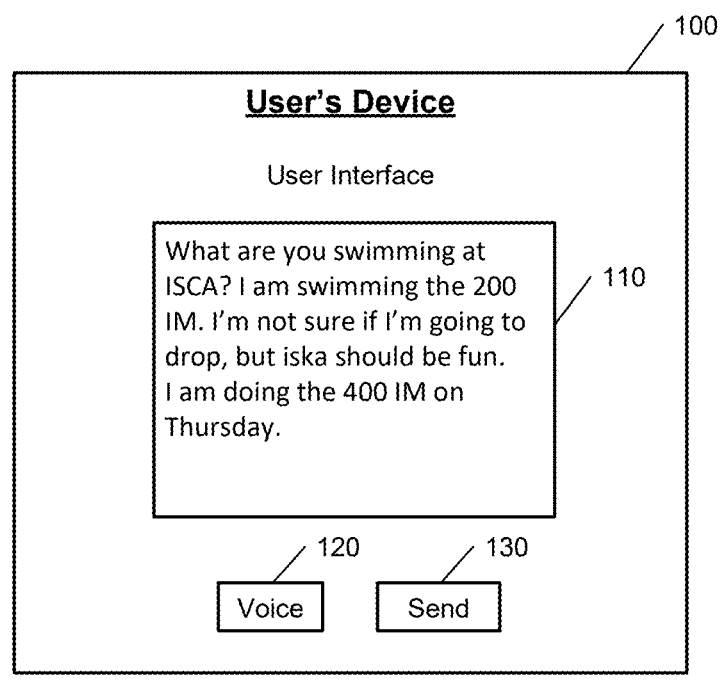

FIG. 1F shows the text message resulting from the automated corrective actions discussed with respect to FIGS. 1A-1E. As shown in FIG. 1F, the user did not accept the corrective action presented in interface 180, but did accept the corrective action recommended in interface 190. With these inputs, the text displayed on display 110 is ready to send as a text message by the user device 100. The user device 100 also uses the user input received as part of the suggested corrective actions to inform processes for performing speech to text conversion and/or automated corrective actions for converted speech. For example, the user device 100 uses the rejection of the corrective action presented in interface 180 to inform speech to text conversion and/or automated corrective actions. In this example, the user device 100 reinforces the part of the speech to text conversion process that resulted in the correct conversion from speech to text and/or uses the rejection of the corrective action as an input for future speech to text processing. The user device 100 also may use the rejection of the corrective active as an input to the process for performing automated correction and/or adjust the automated corrective process to make it more likely that the automated correction process would not present a similar corrective action in future situations (e.g., adjusting a weight value to make it less likely that a similar type of the corrective action would be presented in future situations). The user device 100 handles the acceptance of the recommended corrective action presented in interface 190 in a similar, but opposite, manner in that it attempts to adjust speech to text conversion processing to convert similar speech to the corrected text in the first instance and attempts to adjust the automated correction process to recommend or automatically implement a similar corrective action in future situations (e.g., adjusting a weight value to make it more likely that a similar type of the corrective action would be recommended or automatically taken in future situations). The user device 100 may use machine learning to refine the speech to text conversion process and/or the automated correction process based on the rejection of the corrective action presented in interface 180 and the acceptance of the corrective action presented in the interface 190 to improve the user device 100 by enabling more accurate speech to text conversion and/or more accurate automated correction actions.

Figure 2:
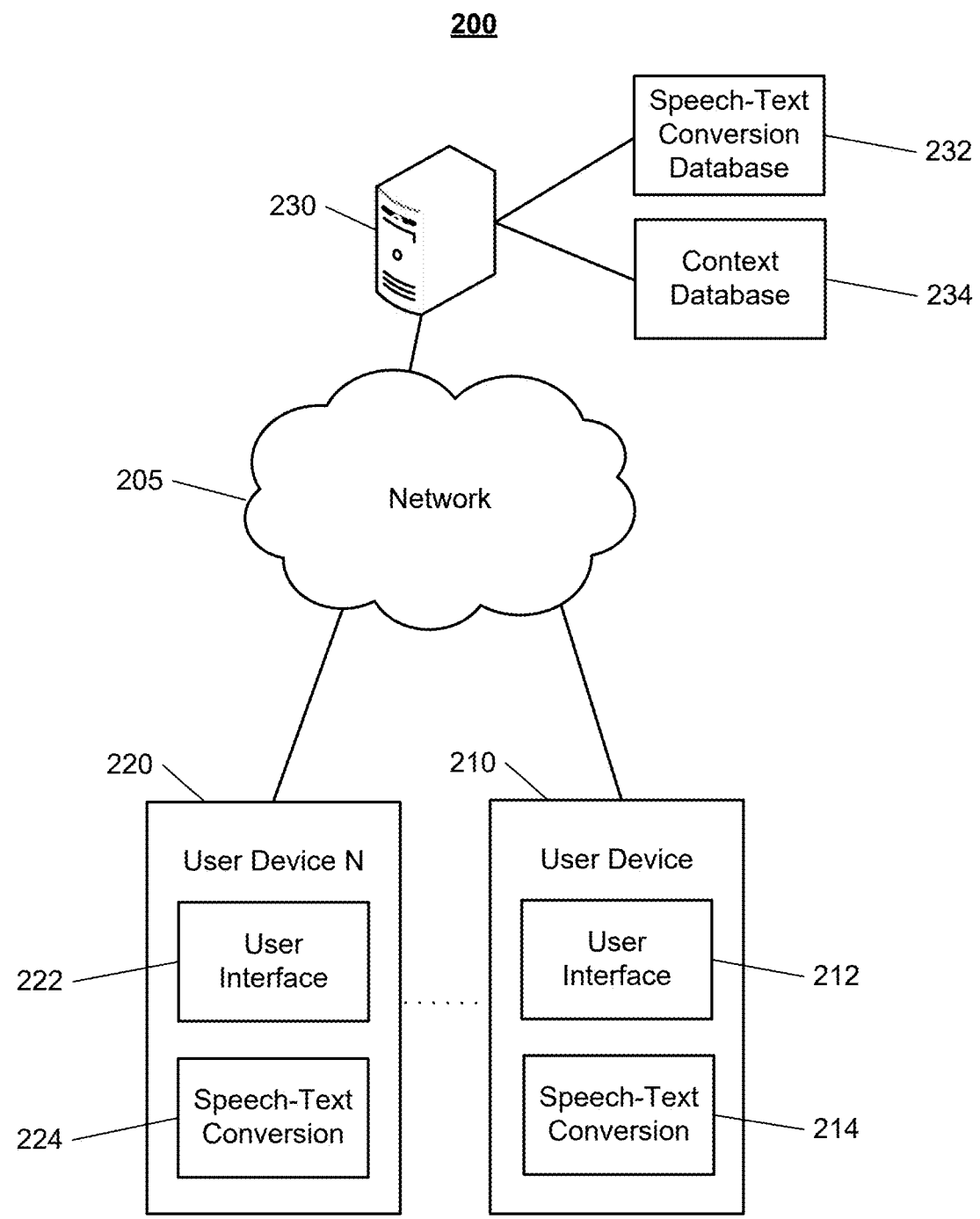
FIG. 2 illustrates an example system.

FIG. 2 illustrates an example of an electronic system 200 configured to perform automated dictation correction. As shown in FIG. 2, the system 200 includes a network 205, one or more user devices 210 and 220, and a server 230 configured to communicate with the one or more user devices 210 and 220 over the network 205.

The network 205 is configured to enable exchange of electronic communications between devices connected to the network 205. For example, the network 205 can be configured to enable exchange of electronic communications between the one or more devices 210 and 220 and the server 230. The network 205 can include, for example, one or more of the Internet, Wide Area Networks ("WANs"), Local Area Networks ("LANs"), analog or digital wired and wireless telephone networks (e.g., a public switched telephone network ("PSTN"), Integrated Services Digital Network ("ISDN"), a cellular network, and Digital Subscriber Line ("DSL")), radio, television, cable, satellite, any other delivery or tunneling mechanism for carrying data, or a combination of these. The network 205 can include multiple networks or subnetworks, each of which can include, for example, a wired or wireless data pathway. The network 205 can include a circuit-switched network, a packet-switched data network, or any other network able to carry electronic communications (e.g., data or voice communications). For example, the network 205 can include networks based on the Internet protocol ("IP"), asynchronous transfer mode ("ATM"), the PSTN, packet-switched networks based on IP, X.25, or Frame Relay, or other comparable technologies and can support voice using, for example, voice over IP ("VOIP"), or other comparable protocols used for voice communications. The network 205 can include one or more networks that include wireless data channels and wireless voice channels. The network 205 can be a broadband network.

The one or more devices 210 and 220 are devices that can present content, e.g., display user interfaces, and receive input, e.g., voice input provided to a microphone. For instance, the device 210 may be a mobile device that hosts or runs one or more native applications (e.g., the speech to text conversion application 214). The mobile device 210 can be a cellular phone or a non-cellular locally networked device with a display. The mobile device 210 can include a cell phone, a smart phone, a tablet PC, a personal digital assistant ("PDA"), or any other portable device configured to communicate over a network and present information. The mobile device 210 can perform functions, such as placing personal telephone calls, exchanging text messages, playing music, playing video, displaying pictures, browsing the Internet, and maintaining an electronic calendar.

The mobile device 210 can include a user interface 212 and a speech to text conversion application 214. The user interface 212 includes user interface components that allow a user to interact with the mobile device 210. For example, the user interface 212 may include a display (e.g., a touch-sensitive display) that displays content (e.g., text). The user interface 212 also may include a speaker to present audible output to the user. The user interface 212 further may include devices that allow a user to provide input to the mobile device 210, such as a touchscreen, physical or virtual buttons, and a microphone to receive voice input. The user interface 212 may be a mobile user interface with a graphical and touch-sensitive display that allows the user to interact with the device's applications, features, content, and functions.

The speech to text conversion application 214 refers to a software/firmware program running on the corresponding mobile device that receives voice input, converts the voice input to text, and displays the text on the user interface 212. The speech to text conversion application 214 may include speech recognition software that enables the recognition and translation of spoken language into text through computational linguistics. The speech recognition software may receive audio and deliver an editable, verbatim transcript on the user interface 212 through voice recognition. The speech recognition software may draw on linguistic algorithms to sort auditory signals from spoken words and transfer those signals into text using characters. The speech to text conversion application 214 may transcribe audio streams in real-time to display text and allow a user to act on the displayed text.

In some implementations, the speech to text conversion application 214 may convert speech to text through a complex machine learning model that involves several steps. For instance, when sounds come out of someone's mouth to create words, the sounds make a series of vibrations. The speech to text conversion application 214 may pick up on these vibrations and translate them into a digital language through an analog to digital converter. The analog-to-digital-converter takes sounds from an audio file, measures the waves, and filters them to distinguish the relevant sounds. The sounds are then segmented into hundredths or thousandths of seconds and matched to phonemes. A phoneme is a unit of sound that distinguishes one word from another in any given language. For example, there are approximately 40 phonemes in the English language. The phonemes are then run through a network via a mathematical model that compares them to well-known sentences, words, and phrases. The text is then presented as text based on the audio's most likely version.

In some implementations, the speech to text conversion application 214 may include speaker-dependent and/or speaker-independent processes. For a speaker-dependent process, the speech to text conversion application 214 tailors the speech to text conversion to a particular speaker. By focusing on the particular speaker, the speaker-dependent process can provide more accurate speech to text conversion because the process can be tuned to the characteristics of the particular speaker's voice. For a speaker-independent process, the speech to text conversion application 214 uses a general speech to text conversion process that is designed to work for any user that is providing speech input.

The device 220 can be a mobile device similar to the device 210, or can be a general-purpose computer (e.g., a desktop personal computer, a workstation, or a laptop computer). The user interface 222 may be the same or similar to the user interface 212 and the speech to text conversion application 224 may be the same or similar to the speech to text conversion application 214. In examples in which the device 220 is a general-purpose computer, the user interface 222 may include user interface components used by general purpose computers (e.g., a larger display, an external display, a mouse, etc.) and/or the speech to text conversion application 224 may include a more computationally-intensive process to convert speech to text that takes advantage of the additional computing resources (e.g., higher processing power, additional memory, additional storage, etc.) typically available to general purpose computers as compared to mobile devices. In some implementations, the speech to text conversion application 224 may be tailored to the device 220. In these implementations, the speech to text conversion process executed by the speech to text conversion application 224 may be tuned to specific conditions of the device 220 (e.g., the components of the device 220, characteristics of the microphone used by the device 220, the environment where the device 220 is typically used, etc.) and/or tuned to specific users that use the device 220 (e.g., the owner of the device 220, various user profiles when the device 220 is shared among multiple users, etc.). Although FIG. 2 illustrates two devices for brevity, actual implementations can include more (and, perhaps, many more) or fewer devices.

The server 230 is an electronic device configured to execute programs, access data from speech to text conversion database 232, access data from context database 234, and exchange communications with the multiple user devices 210 and 220 over the network 205. In some examples, the server 230 assists the multiple user devices 210 and 220 with speech to text conversion and automated dictation correction. For instance, the server 230 can coordinate with the multiple user devices 210 and 220 to perform speech to text conversion with a first portion of the processing being performed by the server 230 and a second portion of the processing being performed by the speech to text conversion applications 214 and 224. The server 230 also can provide the multiple user devices 210 and 220 with executable code used for the speech to text conversion applications 214 and 224 and can provide updates to the executable code as improvements to speech to text conversion occurs. The server 230 further can coordinate with the multiple user devices 210 and 220 to perform automated dictation correction in a manner similar to how the server 230 coordinates with the multiple user devices 210 and 220 to perform speech to text conversion (e.g., by performing portion(s) of the automated dictation correction processing, providing executable code used for automated dictation correction, etc.). The server 230 may include multiple servers or computers that communicate with each other and over network 205.

The speech to text conversion database 232 is an electronic device configured to store data for speech to text conversion and exchange communications with the server 230 (e.g., multiple servers or computers) over a direct connection or network. For example, the speech to text conversion database 232 may be configured to store data for speech to text conversion and send stored data to the server 230 in response to requests (e.g., SQL statements or queries). The speech to text conversion database 232 may store parts of a machine learning model used for speech to text conversion. For instance, the speech to text conversion database 232 may store phonemes and known sentences, words, and phrases to which the phonemes correspond. The speech to text conversion database 232 may store a dictionary of known sentences, words, and phrases that is used for speech to text conversion. The speech to text conversion database 232 may include one or more databases and/or data warehouses.

The server 230 may access data from the speech to text conversion database 232 in assisting with speech to text conversion and may update the data stored in the speech to text conversion database 232 based on feedback received from the multiple user devices 210 and 220. For example, the server 230 may update the parts of the machine learning model (e.g., the dictionary used for text to speech conversion) stored in the speech to text conversion database 232 based on updates to speech to text processing, feedback related to speech to text accuracy received from the multiple user devices 210 and 220, and/or feedback related to text corrections 10 made to dictated speech received from the multiple user devices 210 and 220. By updating the speech to text conversion database 232 based on feedback, the server 230 may improve the accuracy of speech to text conversion.

In some implementations, the speech to text conversion database 232 stores speaker-dependent and speaker-independent data. The speaker-independent data may be a general process that is used when an identity of a speaker is unknown or a speaker-dependent model is unavailable for the speaker. The speaker-dependent data may be data tailored to a specific speaker or group of speakers. For example, the speaker-dependent data may include a speech to text conversion model tailored to each speaker associated with the multiple user devices 210 and 220. In this example, the tailored speech to text conversion model may be tuned to the specific speech patterns, accent, and/or words used by the speaker to more accurately convert speech for the specific speaker. To tailor the speech to text conversion model, the server 230 may consider feedback related to accuracy of speech to text conversion for the specific speaker, text corrections made by the specific speaker for converted speech, and/or test data provided by the specific speaker. In some examples, the speaker-dependent data may correspond to a group of users, such as a family model used for people in a family that have similar speech patterns, a geographic model used for particular people in a particular geographic region that may have similar accents, a gender/ethnicity model used for people having the same gender/ethnicity, etc.

The context database 234 is an electronic device configured to store context data for automated dictation correction and exchange communications with the server 230 (e.g., multiple servers or computers) over a direct connection or network. The context database 234 may be similar to the speech to text conversion database 232, but stores context data used for automated dictation correction. For instance, the context database 234 may store text entered by users without voice and weightings associated with such text, store surrounding text that was not corrected and weightings associated with such text, store parts of speech of text, store user profile information, store text corrections made by users, store timing of text corrections, and store locations of text corrections. The context database 234 may store any type of context data described throughout this disclosure and may use the context data to help improve automated dictation correction.

In some implementations, the context database 234 stores speaker-dependent and speaker-independent context data. The speaker-independent data may be for general correction suggestions when an identity of a speaker is unknown or speaker-dependent context data is unavailable for the speaker. The speaker-dependent context data may be data tailored to a specific speaker or group of speakers. For example, the speaker-dependent data may include context data tailored to each speaker associated with the multiple user devices 210 and 220. In this example, the tailored context data may be for a specific speaker based on corrections the specific speaker has made to converted text. In some examples, the speaker-dependent data may correspond to a group of users, such as family context data used for people in a family that have similar speech patterns, geographic context data used for particular people in a particular geographic region that may have similar accents, gender/ethnicity context data used for people having the same gender/ethnicity, etc.

FIGS. 3-5 and 7 illustrate example processes. The operations of the example processes are described generally as being performed by the system 200. The operations of the example processes may be performed by one of the components of the system 200 (e.g., user device 210, server 230, etc.) or may be performed by any combination of the components of the system 200. In some implementations, operations of the example processes may be performed by one or more processors included in one or more electronic devices.

Figure 3:
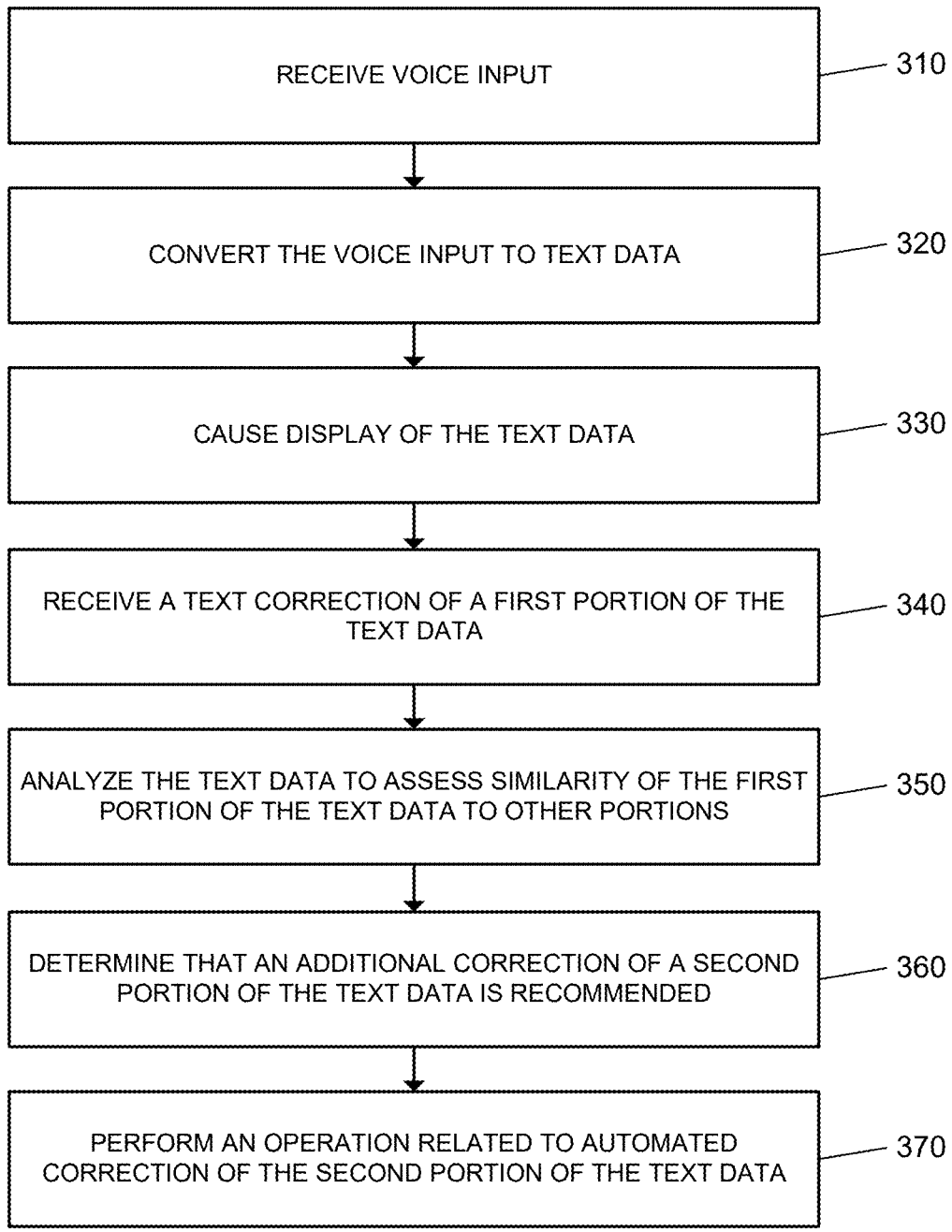
FIGS. 3-5 and 7 are flow charts of example processes.

FIG. 3 illustrates an example process 300 for performing automated dictation correction. The example process 300 begins when the system 200 receives voice input (310). For example, the system 200 receives user input from a user to provide voice input to an application (e.g., a text messaging application, a notes application, a word processing application, etc.) and then receives, through a microphone, voice input spoken by a user.

Based on the received voice input, the system 200 converts the voice input to text data (320). For instance, the system 200 applies the received input to a speech to text conversion application for conversion of the voice input to text data. As discussed above, the system 200 may apply the received voice input to a machine learning model configured to map the voice input to a dictionary of phonemes and identify text data that corresponds to the mapped phonemes.

After conversion of the voice input to the text data, the system 200 causes display of the text data (330). For instance, the system 200 displays the text data as part of a user interface for an application (e.g., a text messaging application, a notes application, a word processing application, etc.).

After displaying the text data, the system 200 receives a text correction of a first portion of the text data (340). For example, the system 200 receives user input from a user that changes a portion of the text data from first text to second text that is different than the first text. In this example, the system 200 may receive user input that deletes one or more words of the text data and replaces the deleted one or more words with one or more other words. The system 200 also may receive user input that corrects the spelling of one or more words (e.g., changes "their" to "there").

Based on receipt of the text correction of the first portion of the text data, the system 200 analyzes the text data to assess similarity of the first portion of the text data to other portions (350). For example, the system 200 identifies portions of the text data of similar length to the first portion of the text data and compares the first portion of the text data to the identified portions of text data to assess similarity of the first portion of the text data to each of the identified portions of text data. In this example, the system 200 considers whether the length and text of each analyzed portion of the text data is within a threshold level of similarity to the text that was corrected by the user and, if so, the system 200 flags the similar text data as a candidate for an additional correction.

In some implementations, the system 200 reevaluates the voice input with the text correction as an input considered in conversion of the voice input corresponding to the other portions of the text data. In these implementations, the system 200 reassesses the original voice input by providing the text correction with the original voice input to the speech to text conversion application (e.g., to a machine learning model) to perform a second conversion of the original voice input to text data that accounts for the correction the user made to the original converted text. The system 200 then compares the second converted text to the original converted text to determine whether additional corrections are recommended (e.g., where the second conversion resulted in different text than the original conversion).

In some examples, the system 200 evaluates context of the text correction in assessing similarity of the first portion of the text data to other portions of the text data. In these examples, the system 200 may consider any aspects of context data described throughout this disclosure to determine whether the context of the text correction matches the context of other portions of the text data or otherwise suggests that a similar correction is recommended for other portions of the text data. For instance, the system 200 may evaluate prior text entered by the user without voice and weight a correction recommendation more heavily based on the correction recommendation matching the prior text entered by the user without voice. The system 200 also may evaluate surrounding text that was not corrected and weight a correction recommendation more heavily based on the correction recommendation matching the surrounding text that was not corrected. The system 200 further may determine a part of speech of the first portion of the text data, determine parts of speech of the other portions of the text data, and evaluate the part of speech of the first portion of the text data against the parts of speech of the other portions of the text data to assess similarity. If the parts of speech are the same, the system 200 determines that the portions of text are similar, but, if not, the system 200 determines that the portions of text are less likely to be similar. In addition, the system 200 may access a profile of the user, evaluate the profile of the user in assessing similarity, and weight a correction recommendation more heavily based on the correction recommendation matching the profile of the user. The profile may indicate biographic information for the user, interests of the user, past corrections made by the user, and/or any other information that would be helpful in assessing intent of voice input provided by the user. The system 200 also may access (e.g., from a server with a database) correction data representing text corrections made by other users, evaluate the text corrections made by the other users, and weight a correction recommendation more heavily based on the correction recommendation matching at least one of the text corrections made by the other users. The system 200 further may determine a timing and/or location for the text correction and evaluate the timing and/or location for the text correction in assessing similarity (e.g., relate corrections made at a similar time/location to the present input, tailor correction processing towards words or speech patterns used at the particular time of day or day of week, tailor correction processing towards words or speech patterns used at the particular location, etc.).

Based on the analysis, the system 200 determines that an additional correction of a second portion of the text data is recommended (360). For instance, the system 200 determines that the second portion of the text data is within a threshold level of similarity to the first portion of the text data that was corrected by the user and, based on the determination of the threshold level of similarity, determines that a similar correction to the second portion of the text data is recommended. The system 200 may assess the similarity by computing a percentage likelihood that a similar correction is appropriate and may compare the percentage likelihood to a threshold percentage (e.g., 50%, 75%, 90%, etc.). When the percentage likelihood meets the threshold percentage, the system 200 determines that the additional correction to the second portion of the text data is recommended.

Based on the determination that the additional correction of the second portion of the text data is recommended, the system 200 performs an operation related to automated correction of the second portion of the text data (370). For example, the system 200 may automatically correct the second portion of the text data representing the one or more sentences based on the additional correction recommended. In this example, the system 200 may display an indication that indicates that the second portion of the text data representing the one or more sentences has been automatically corrected to alert the user that the automatic correction occurred. The system 200 also may provide a limited time option to revert the automatic correction back to the second portion of the text data. The limited time option may be a popup user interface that allows the user to provide a user input (e.g., a graphical button selection) to revert the automatic correction back to the second portion of the text data.

In some implementations, the system 200 displays a suggestion to make the additional correction of the second portion of the text data representing the one or more sentences. In these implementations, the system 200 may display the suggestion to make the additional correction of the second portion of the text data representing the one or more sentences with at least one control that allows the user to accept or reject the additional correction of the second portion of the text data representing the one or more sentences. In this regard, the user may accept or reject the correction with a relatively easy user input and, when the correction is appropriate, the user may accept and apply the correction using a faster user input than would be needed to re-enter the correction.

In some examples, the system 200 determines the corrective action based on how similar the second portion of the text data is to the first portion of the text data, accounting for context. In these examples, when the system 200 uses a percentage likelihood to assess similarity, the system 200 may use different percentage thresholds to select different corrective actions. For instance, if the percentage likelihood is above a 90% similarity, the system 200 may perform automatic correction without additional user interface changes. If the percentage likelihood is between a 75-90% similarity, the system 200 may perform automatic correction with a user interface option to revert the automatic correction within a limited time period. If the percentage likelihood is between a 50-75% similarity, the system 200 may suggest the correction and await user input to apply the recommended correction.

Figure 4:
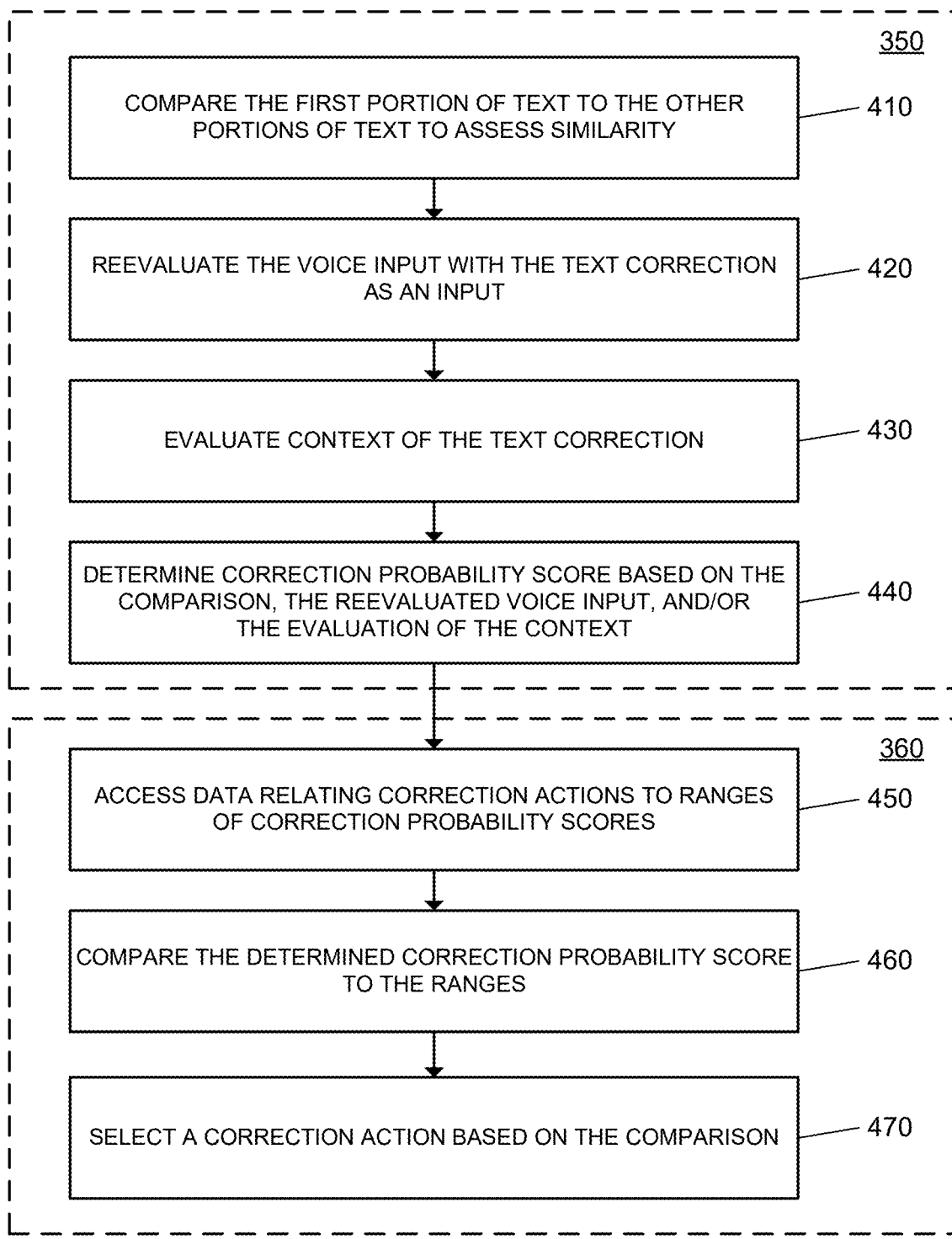

FIG. 4 illustrates an example process 400 for analyzing text data and determining that an additional correction of the text data is recommended. The process 400 may be performed as part of the operations described above with respect to reference numerals 350 and 360.

The process 400 begins by comparing the first portion of text to the other portions of text to assess similarity (410). For example, the system 200 may compare the first portion of text that was corrected by the user to the other portions of text that were entered by the user's voice input, and determine whether the first portion of text matches any of the other portions of text. If the system 200 determines that the first portion of text matches another portion of text, the system 200 assigns a high degree of similarity to the other portion of text and is likely to suggest a correction for the other portion of text because a similar error was likely made in converting the voice input to the other portion of text. As part of the comparison and assessment of similarity, the system 200 may consider non-exact matches of text and provide a rating of how similar the first portion of text is to the non-exact matches. For instance, the system 200 may assign a probability metric of 0 to 100 to reflect how close the other portion of text is to the first portion of text that was corrected. An exact match would be given a score of 100, whereas text with no similarity would be given a score of 0. For non-exact matches, the system 200 provides an assessment of how close the non-exact match is to the first portion of text, considering the number of characters in common, how close the other portion of text is to the first portion of text in terms of the sound, and any other attributes of the text that suggest similarity. For instance, where a first part of the text is similar to a first part of the first portion of text, but a second part of the text is dissimilar to a second part of the first portion of text, the system 200 may assign a similarity score of 50 to the text to reflect that half of the text is similar, but half is not.

The system 200 also reevaluates the voice input with the text correction as an input (420). For instance, the system 200 re-processes the voice input using the text correction as an input to the process so that the system 200 ensures that the voice input for the first portion of text is converted correctly. The system 200 also may reassess the model used to convert the first voice input based on the text correction and use the reassessed or updated model to process the original voice input. In this way, the system 200 reevaluates the voice input and may do so more accurately because it accounts for the text correction that was made and offers improved performance where it failed previously. By reevaluating the voice input, the system 200 can compare the previously converted text to the newly converted text to identify areas of similarity and areas of difference. For the text that was converted in the same manner, the system 200 reinforces the earlier conversion process and is less likely to suggest a correction for text that was converted the same way in both instances. For the differences, the system 200 is more likely to suggest a correction because the updated process in reevaluating the voice input arrived at a different result. By re-processing the voice input to account for the correction, the system 200 produces another representation of the converted text to aid in the determination of whether an additional correction is recommended.

The system 200 further evaluates context of the text correction (430). The system 200 may consider any types of context data described throughout this disclosure in evaluating the text correction. For instance, the system 200 may evaluate prior text entered by the user without voice and evaluate surrounding text that was not corrected. The system 200 also may evaluate parts of speech of the text correction and the other portions of text. The system 200 further may evaluate a user profile of the user that provided the voice input and text correction. In addition, the system 200 may evaluate text corrections made by other users, evaluate the timing for the text correction, and/or evaluate the location for the text correction.

Figure 5:
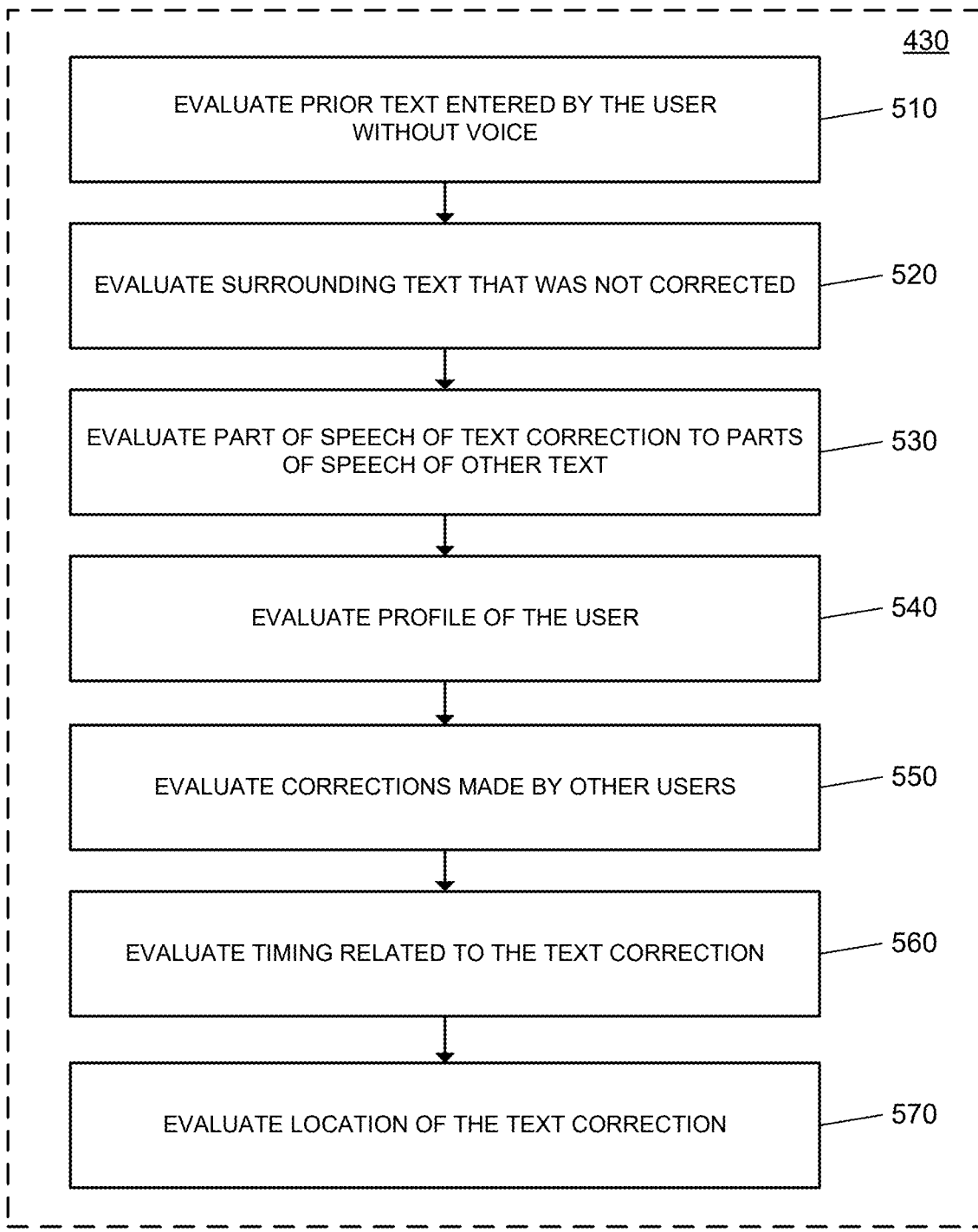

FIG. 5 illustrates an example process 500 for evaluating context of the text correction. The process 500 may be performed as part of the operations described above with respect to reference numeral 430.

The process 500 begins by evaluating prior text entered by the user without voice (510). In evaluating context, the system 200 may consider factors that suggest whether converted text should be corrected or not. By considering prior text entered by the user without voice, the system 200 can learn what words or text the user intended. Because the text was entered without voice input, the system 200 assumes the text was entered correctly and can use the entered text as a guide to assess the types of words and phrases the user intended through voice input. For instance, if the user entered text is similar to converted text entered with voice input, the system 200 is more likely to determine that the voice converted text is accurate. However, if the user entered text is different than the converted text, but has some similarities, the system 200 is more likely to determine that the converted text was converted incorrectly and should have been converted to the same text as the text that the user typed.

The system 200 also evaluates surrounding text that was not corrected (520). For example, the system 200 identifies text that is located prior to the text that was corrected by the user and considers that text as surrounding text that was not corrected by the user. In this example, the system 200 infers that the prior text was evaluated and not corrected by the user because it came before the first portion of text that was corrected, but was not corrected by the user. Based on this inference, the system 200 considers the surrounding text as text that was converted correctly from the voice input. The system 200 then treats the surrounding text that was not corrected similarly to the text entered by the user without voice input, as discussed with respect to reference numeral 510. As with the text that was not entered with voice input, the surrounding text that was not corrected is deemed to reflect words or phrases that were entered correctly and are unlikely to need correction if appearing again in later text. If the user has entered multiple text corrections, the system 200 can be more sophisticated in its determination of surrounding text that was not corrected, such as designating the text that falls between two entered corrections as being text that is highly likely to have been accurately converted. In this way, the system 200 may weight the highly likely correct text higher than surrounding text that has been inferred to be correct because it was entered prior to a text correction.

The system 200 further evaluates a part of speech of the text correction in comparison to parts of speech of other text (530). In assessing context, the system 200 may consider parts of speech and grammar rules in evaluating the text correction. For instance, if the part of speech of the first portion of text is the same as the part of speech of the other portions of text, the system 200 determines that an additional correction is more likely needed. However, if the part of speech is different, the system 200 determines that correction is less likely to be appropriate. The system 200 also evaluates grammar rules in assessing an additional correction. In this regard, if the converted text is flagged as having a grammar issue, the system 200 determines that a correction is more likely appropriate. However, if the converted text is grammatically correct, it is less likely that correction is needed. The system 200 also considers grammar rules if the text correction was applied to the other text. If applying the text correction results in a grammatically correct sentence, the system 200 is more likely to recommend the correction. However, if applying the text correction results in a grammatically incorrect sentence, the system 200 considers that context and is unlikely to suggest a correction that results in improper grammar.

In some implementations, the system 200 evaluates a profile of the user (540). As additional context, the system 200 may consider a profile for the user that provided the voice input. The user profile may include information about the user's interests and personal information about the user. For example, the user profile may include information about the user's address and the user's geographic background. In this example, the system 200 may use geographic information about the user to assist in preforming speech to text conversion and in suggesting text corrections. The system 200 may consider accents of people that are from the geographic location of the user and use accent information to evaluate voice input and/or text corrections. In this regard, the system 200 may be more likely to suggest a text correction where a particular accent would result in an error in the speech to text conversion that is consistent with the text correction the user provided.

The system 200 also may consider interests of the user in identifying words or acronyms that may be used by the user. For instance, if the user is interested in swimming, it is more likely that the user uses acronyms that are associated with the sport of swimming, such as different team names, meet names, or event designations. The system 200 may couple geographic information with interest information and use that to determine words/acronyms that are more likely to be used by the user based on their current address as well as the user's interest. The system 200 may select a particular database of acronyms to use based on the user profile information, tailoring the voice recognition and text correction recommendations to acronyms that are most likely to be used by the user. With this tailoring, the system 200 is able to provide improved speech to text processing and correction recommendations that are more likely to suggest corrections that are directed to acronyms that are likely to be used by the user, but are otherwise are not part of a normal dictionary of words.

The system 200 also evaluates corrections made by other users (550). In some examples, the system 200 considers text corrections made by other users in assessing context of a text correction to recommend to the user based on the user's voice input. In these examples, the system 200 may assess whether converted text was corrected by other users in a manner that would be similar to text that the user has entered through voice and/or that is the subject of potential correction. If the system 200 determines that other user's corrected similar text, the system 200 is more likely to suggest a correction to the user. If the system 200 determines that other users rejected similar corrections, the system 200 is less likely to suggest the correction to the user.

In selecting users to consider in evaluating other user text corrections, the system 200 may consider profile information for the user and select other users that have similar profile information. For instance, the system 200 may identify other users in the same geographic location as the user (either the current location of voice/text input or geographic address/origin), and use text corrections provided or rejected by the other users in the same geographic location. The system 200 also may consider interests of other users and identify other users that have similar interests to the user that provided the voice input. For instance, the system 200 may identify users that have the interest of swimming, and consider the text corrections made by those users. By considering the geographic location and interests of other users in identifying a set of users to consider in assessing other user text corrections, the system 200 considers text corrections made by other users that are likely to provide similar input to the user and thus provide more accurate text correction recommendations.

The system 200 evaluates timing related to the text correction (560). For example, certain words and/or acronyms may be more likely at different times of the day, different days of the week, different months of the year, etc., and the system 200 considers the time in suggesting corrections. In this example, the system 200 may suggest a correction directed to a school or work acronym when the voice input or text correction is provided during a weekday when the user is more likely to be in school or working. On the weekend, the system 200 may be more likely to suggest a correction directed to leisure activities or interests that the user may be engaging in on the weekend. The system 200 also may consider time of day, attributing certain words as being more likely when spoken in the morning versus other words that are more likely to be spoken in the evening. The system 200 further may consider month of year, attributing certain words as being more likely when spoken in a particular season versus other words that are more likely to be spoken in another season.

The system 200 further evaluates the location of the text correction (570). In some implementations, the system 200 considers the location of where voice input and text corrections are provided. In these implementations, the system 200 may use a GPS location of the user to determine the location where voice input or text correction input was provided. The GPS location may be used similarly to the geographic information discussed above, but provides a current location of the user, which may be different than the address where the user resides or the geographic location from which the user originates. By considering a current location, the system 200 may provide a dynamic location-based dictionary of terms, such as acronyms, that are appropriate for the current location of the user. The system 200 may consider the current location, other geographic information, and timing considerations together when assessing the context of text corrections.

In some implementations, in assessing context, the system 200 considers all of the types of context information together to derive an overall context assessment for a potential text correction recommendation. In these implementations, the system 200 may develop an overall context score for a potential text correction recommendation that accounts for each type of context information discussed above. For example, if multiple types of context information suggest that a text correction recommendation is appropriate, the system 200 may determine a relatively high overall context score. Conversely, if multiple types of context information suggest that a text correction recommendation is inappropriate, the system 200 may determine a relatively low overall context score. When different types of context information conflict in support or lack of support for a correction recommendation, the system 200 may determine an overall context score that falls between the relatively high and low levels, such as a medium overall context score that represents the mixed context evaluation for the potential text correction. The system 200 may use a set of rules to evaluate the context information or may use a process to calculate an overall context score that evaluates all of the different types of context information.

Returning to FIG. 4, in some implementations, the system 200 determines a correction probability score based on the comparison of similarity, the reevaluated voice input, and/or the evaluation of the context (440). In these implementations, the system 200 determines a correction probability score for each other portion of text entered by the user through voice input. In determining each correction probability score, the system 200 considers the similarity of the other portion of text to the first portion of text that was corrected, considers whether the other portion of text remains the same after reevaluation of the voice input, and considers whether context information suggests that the other portion of text should be corrected. From this evaluation, the system 200 calculates a correction probability score that factors in each of these considerations. The correction probability score may be a score ranging from 0 to 100, where a score of 100 indicates that a correction is highly likely to be correct and where a score of 0 indicates that a correction is highly unlikely to be correct. In computing the correction probability score, the system 200 may take a holistic view of each of the various factors. For instance, if the other portion of text is the same as the first portion of text that was corrected, the other portion of text reevaluates to the text that was corrected, and context suggests that correction is appropriate, the system 200 calculates a relatively high probability score, such as in the range of 95 to 100. Alternatively, if the other portion of text is different from the first portion of text that was corrected, the other portion of text reevaluates to the same text upon re-processing, and context does not suggest that the correction is appropriate, the system 200 calculates a relatively low probability score, such as in the range of 0 to 10. When the different types of correction likelihood assessments differ, the system 200 calculates a correction probability score that is closer to the middle. For instance, if the other portion of text matches the portion of text that was corrected, but does not reevaluate to the corrected text and context suggests that correction is inappropriate, the system 200 calculates a lower probability score, such as in the range of 35 to 50. As another example, if the other portion of text does not match the portion of text that was corrected exactly, but is close, the other portion of text does not reevaluate to the corrected text, and context suggests a high probability that correction is appropriate, the system 200 calculates a higher probability score, such as in the range of 50 to 65. In this way, the system 200 computes a score that reflects the confidence in the recommendation for a potential text correction.

In some examples, the system 200 uses a mathematical process to calculate the correction probability score. In these examples the system 200 may take as input a similarity score determined as part of the operations described with respect to reference numeral 410 and an overall context score determined as part of the operations described with respect to reference numeral 500. The system 200 may compute the correction probability score as an average of these two values and then increase or decrease the average correction probability score based on whether the other portion of text reevaluated to the same text or different text when the original voice input was re-processed to account for the text correction (e.g., by increasing or decreasing the average correction probability score by 10). Various weightings, rules, and computations may be used to compute a correction probability score that accurately reflects the evaluation of the similarity, the reevaluated voice input, and the context and indicates the confidence in whether an additional text correction is recommended.

The system 200 accesses data relating correction actions to ranges of correction probability scores (450). For instance, the system 200 accesses, from electronic storage, a table that stores data relating correction actions to ranges of correction probability scores.

The system 200 then compares the determined correction probability score to the ranges (460). For example, the system 200 compares the determined correction probability score that was computed in the operations described with respect to reference numeral 440 to the ranges in the table that was accessed as part of the operations described with respect to reference numeral 450.

Based on the comparison, the system 200 selects a correction action (470). For instance, the system 200 selects the correction action that is associated with the range in which the determined correction probability score falls. Any type of correction action described throughout this disclosure may be selected, such as automatic correction, automatic correction with highlighting, a suggestion to make the correction, a time limited option for making the correction, no correction recommendation, etc.

FIG. 6 illustrates example data 600 for relating correction recommendation actions to ranges of correction probability scores. The example data 600 may be accessed as part of the operations described with respect to reference numeral 450, compared against a determined correction probability score as part of the operations described with respect to reference numeral 460, and used to select a correction action as part of the operations described with respect to reference numeral 470. The example data 600 may include a table with a first column 610 for automated correction action and a second column 620 for a range of correction probability scores. Each of the rows 630-690 in the table relate one correction action to a range of correction probability scores. Specifically, the row 630 relates the correction action of automatic correction to a range of correction probability scores that spans 95 to 100. By associating automatic correction to the highest range of correction probability scores, the system 200 only performs automatic correction without highlighting when the system 200 has the highest degree of confidence that correction is appropriate.

The row 640 relates the correction action of automatic correction with highlighting to a range of correction probability scores that spans 85 to 94. By associating automatic correction with highlighting to the second highest range of correction probability scores, the system 200 performs automatic correction with highlighting when the system 200 has a high degree of confidence that correction is appropriate.

The row 650 relates the correction action of suggesting a correction with a "Correct All" option to a range of correction probability scores that spans 75 to 84. The "Correct All" option allows the user to provide input to implement the text correction in multiple places where the text correction is recommended. By including the "Correct All" option, the system 200 allows the user to more quickly implement the text correction and arrive at the intended text when multiple instances of the text correction are needed. By associating the suggestion of a correction with the "Correct All" option to the third highest range of correction probability scores, the system 200 provides the suggestion with the "Correct All" option when the system 200 has a medium to high degree of confidence that correction is appropriate.

The row 660 relates the correction action of suggesting a correction with a single option for correction to a range of correction probability scores that spans 65 to 74. The system 200 presents this correction action when the system 200 is not sure correction is needed, while considering correction as more likely than not to be appropriate, but is relatively sure of what the corrected text would be if correction is appropriate. By presenting a single option, the system 200 allows the user to more quickly implement the text correction and arrive at the intended text by simply accepting the correction recommendation. By associating the suggestion of a correction with a single option to the fourth highest range of correction probability scores, the system 200 provides the suggestion with the single option when the system 200 has a medium degree of confidence that correction is appropriate, but has a high degree of confidence in what the corrected text would be if correction is needed.

The row 670 relates the correction action of suggesting a correction with multiple options for correction to a range of correction probability scores that spans 50 to 64. The system 200 presents this correction action when the system 200 is not sure correction is needed, while considering correction as more likely than not to be appropriate, and is unsure of what the corrected text would be if correction is appropriate. By presenting multiple options, the system 200 allows the user to more quickly select the appropriate text correction and arrive at the intended text by choosing the appropriate text from among available options instead of having to enter the corrected text when the correct option is not presented. By associating the suggestion of a correction with multiple options to the fifth highest range of correction probability scores, the system 200 provides the suggestion with multiple options when the system 200 has a medium degree of confidence that correction is appropriate while also having a medium degree of confidence in what the corrected text would be if correction is needed. The system 200 may vary the number of correction options presented based on the number of potential options and the confidence associated with each option.

The row 680 relates the correction action of highlighting text with an indication that the original text is being maintained to a range of correction probability scores that spans 30 to 49. The system 200 presents this correction action when the system 200 determines that it is more likely than not that correction is unnecessary, but some factors suggest some potential for correction. By associating the highlighting text with an indication that the original text is being maintained action to the second lowest range of correction probability scores, the system 200 provides the highlighting of the maintained text when the system 200 has a low degree of confidence that correction is appropriate.

The row 690 relates the correction action of no action to a range of correction probability scores that spans 0 to 29. By associating the no action option to the lowest range of correction probability scores, the system 200 take no action when the system 200 has the lowest degree of confidence that correction is appropriate.

Figure 7:
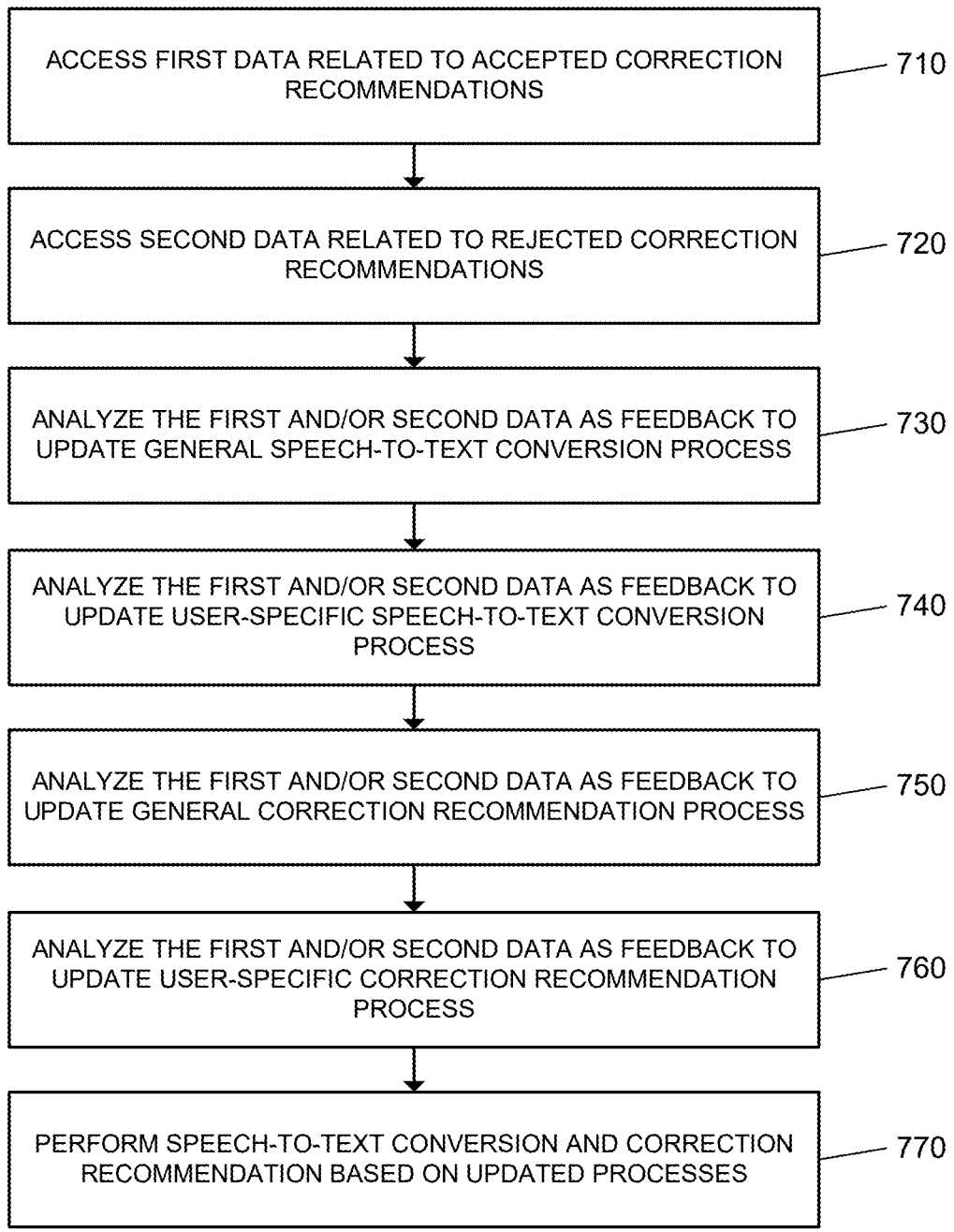

FIG. 7 illustrates an example process 700 for updating speech to text conversion and correction recommendation processes. The process 700 is directed to improving speech to text conversion and correction recommendation processes based on user acceptance or rejection of text corrections that have been recommended to the user.

The process 700 begins by accessing first data related to accepted correction recommendations (710). For example, the system 200 tracks which correction recommendations have been accepted by users and stores data that tracks the accepted correction recommendations. In this example, the system 200 may store general accepted correction recommendations for all users and/or may store user-specific accepted correction recommendations for specific users and/or groups of users. The system 200 may tally a number of acceptances of each of the same type of correction recommendation and associate the acceptances with specific users or specific user attributes (e.g., types of corrections accepted by users with a specific interest or from a specific geographic region). The system 200 then may determine various statistics related to accepted connection recommendations to assess which correction recommendations have been successful. For instance, the system 200 may determine that users that have the interest of swimming generally accept correction recommendations to change a numeric value followed by the text "I am" to the numeric value followed by the text "IM."

The system 200 may access second data related to rejected correction recommendations (720). For example, the system 200 tracks which correction recommendations have been rejected by users and stores data that tracks the rejected correction recommendations. In this example, the system 200 may store general rejected correction recommendations for all users and/or may store user-specific rejected correction recommendations for specific users and/or groups of users. The system 200 may tally a number of rejections of each of the same type of correction recommendation and associate the rejections with specific users or specific user attributes (e.g., types of corrections rejected by users with a specific interest or from a specific geographic region). The system 200 then may determine various statistics related to rejected connection recommendations to assess which correction recommendations have been unsuccessful. For instance, the system 200 may determine that users that do not have the interest of swimming generally reject correction recommendations to change a numeric value followed by the text "I am" to the numeric value followed by the text "IM."

The system 200 analyzes the first and/or second data as feedback to update a general speech-to-text conversion process (730). For example, the system 200 analyzes the first and second data related to accepted and rejected correction recommendations as part of a process to update the general speech to text conversion process. In this example, the system 200 considers all of the first and second data because the update is for a general speech to text conversion process that is speaker independent. By considering all of the data, the system 200 updates the general speech to text conversion process in a manner that is best suited for a general user and considers the acceptances and rejections made by the full set of user data available.

In some examples, the system 200 updates the general speech to text conversion process by tailoring it to more accurately convert speech to text for the accepted correction recommendations and to continue to convert the rejected correction recommendations in the same manner as previously completed. For the accepted correction recommendations, the system 200 identifies common mistakes made by the general speech to text conversion process and adjusts the process to avoid those mistakes in future instances. The system 200 may update the process by adding words or acronyms to a database of available words when the system 200 detects that a threshold number of users have accepted correction recommendations that change text to a word or acronym that is not otherwise in the database used by the general speech to text conversion process.

The system 200 also may adjust how it maps different sounds (e.g., phonemes) to different words in performing speech to text conversion. In this regard, the system 200 may detect that certain sounds are incorrectly converted to a first word or acronym and need to be changed to a second word or acronym. In this case, the system 200 adjusts how it maps the particular sound, changing it from the first word or acronym to the second word or acronym.

The system 200 also may consider statistics within the accepted correction recommendations in adjusting the general speech to text conversion process. For instance, the system 200 may only make adjustments when correction recommendations are accepted over a threshold rate (e.g., 50 or 75%). The system 200 also may use the statistics to adjust weightings applied to different mappings in assessing speech input such that the system 200 may update the process more heavily for more commonly accepted correction recommendations than for correction recommendations that are accepted at a lower rate. The system 200 also may store the accepted correction recommendations as data leveraged by the general speech to text conversion process in performing speech conversion.

For the rejected correction recommendations, the system 200 uses a similar process for updating the general speech to text conversion process, but does so to reinforce the current process that correctly converted the speech input. For instance, the system 200 may increase weightings used by the general speech to text conversion process to reinforce and make it more likely that the general speech to text conversion process continues to convert certain sounds to certain words or acronyms associated with correction recommendations that are rejected over a threshold rate (e.g., 50 or 75%).

In some implementations, the system 200 may use machine learning to update the general speech to text conversion process based on the accepted and rejected correction recommendations. In these implementations, the system 200 may input the accepted and rejected correction recommendations and/or any statistics generated from the accepted and rejected correction recommendations into a machine learning process that tunes the general speech to text conversion process. The system 200 may apply the accepted and rejected correction recommendations to a language model that learns how users accept and reject correction recommendations to improve its processes for converting speech to text.

The system 200 also analyzes the first and/or second data as feedback to update a user-specific speech-to-text conversion process (740). For example, the system 200 analyzes a subset of the first and second data related to accepted and rejected correction recommendations as part of a process to update the user-specific speech-to-text conversion process. In this example, the system 200 considers the subset of the first and second data because the update is for a user-specific speech-to-text conversion process that is speaker dependent. By considering the subset of the data, the system 200 updates the user-specific speech-to-text conversion process in a manner that is best suited for a particular user and considers the acceptances and rejections made by the specific user or users that are in a similar group as the specific user. In this regard, the system 200 may identify the subset of the first and second data by selecting only the accepted and rejected correction recommendations provided by the specific user. The system 200 also may consider groups of users that have similar attributes as the specific user (e.g., live in the same geographic region, have the same interests, etc.) and consider the accepted and rejected correction recommendations provided by the groups of users that have similar attributes in updating the user-specific speech-to-text conversion process that is used for the specific user.

In some implementations, the user-specific speech-to-text conversion process may be a group-specific speech-to-text conversion process that applies to a group of users. In these implementations, the system 200 tailors the group-specific speech-to-text conversion process to be used by a group of users that have similar attributes (e.g., live in the same geographic region, have the same interests, etc.).

The system 200 updates the user-specific speech-to-text conversion process using similar techniques described above for updating the general speech to text conversion process, but tailors the updates to the specific user or group of users. For example, the system 200 updates the user-specific speech-to-text conversion process by tailoring it to more accurately convert speech to text for the user's accepted correction recommendations and to continue to convert the user's rejected correction recommendations in the same manner as previously completed. For the user's accepted correction recommendations, the system 200 identifies common mistakes made by the user-specific speech-to-text conversion process and adjusts the process to avoid those mistakes in future instances. The system 200 may update the process by adding words or acronyms to a user-specific database of available words for the specific user when the system 200 detects that the specific user has accepted correction recommendations a threshold number of times that change text to a word or acronym that is not otherwise in the user-specific database used by the user-specific speech-to-text conversion process.

The system 200 also may adjust how it maps different sounds (e.g., phonemes) to different words in performing speech to text conversion for the specific user. In this regard, the system 200 may detect that certain sounds are incorrectly converted to a first word or acronym and need to be changed to a second word or acronym. In this case, the system 200 adjusts how it maps the particular sound, changing it from the first word or acronym to the second word or acronym for the specific users, but not users generally.

The system 200 also may consider statistics within the accepted correction recommendations in adjusting the user-specific speech-to-text conversion process. For instance, the system 200 may only make adjustments when correction recommendations are accepted by the specific user over a threshold rate (e.g., 50 or 75%). The system 200 also may use the statistics to adjust weightings applied to different mappings in assessing speech input provided by the specific such that the system 200 may update the process more heavily for more commonly accepted correction recommendations than for correction recommendations that are accepted at a lower rate by the specific user. The system 200 also may store the user's accepted correction recommendations as data leveraged by the user-specific speech-to-text conversion process in performing speech conversion.

For the rejected correction recommendations, the system 200 uses a similar process for updating the user-specific speech-to-text conversion process, but does so to reinforce the current process that correctly converted the speech input for the specific user. For instance, the system 200 may increase weightings used by the user-specific speech-to-text conversion process to reinforce and make it more likely that the user-specific speech-to-text conversion process continues to convert certain sounds to certain words or acronyms associated with correction recommendations that are rejected over a threshold rate (e.g., 50 or 75%) by the specific user.

In some implementations, the system 200 may use machine learning to update the user-specific speech-to-text conversion process based on the accepted and rejected correction recommendations. In these implementations, the system 200 may input the accepted and rejected correction recommendations and/or any statistics generated from the accepted and rejected correction recommendations into a machine learning process that tunes the user-specific speech-to-text conversion process for the specific user. The system 200 may apply the accepted and rejected correction recommendations to a language model that learns how the specific user accepts and rejects correction recommendations to improve its processes for converting speech to text for the specific user. In this way, the system 200 learns the speech patterns for the specific user and improves its process for converting speech to text for the specific user.

The system 200 further analyzes the first and/or second data as feedback to update a general correction recommendation process (750). For example, the system 200 analyzes the first and second data related to accepted and rejected correction recommendations as part of a process to update the general correction recommendation process. In this example, the system 200 considers all of the first and second data because the update is for a general correction recommendation process that is speaker independent. By considering all of the data, the system 200 updates the general correction recommendation process in a manner that is best suited for a general user and considers the acceptances and rejections made by the full set of user data available.

In some examples, the system 200 updates the general correction recommendation process by tailoring it to provide correction recommendations related to the accepted correction recommendations and to avoid correction recommendations related to the rejected correction recommendations. For the accepted correction recommendations, the system 200 identifies common corrections made by users and adjusts the process to suggest those types of corrections in future instances. The system 200 may update the process by increasing weightings or rules to make it more likely to recommend the types of corrections associated with accepted corrections. In this regard, the system 200 may update the general correction recommendation process in a manner that will increase the correction probability score when it encounters similar types of potential correction recommendations in future instances. With an increased correction probability score, the updated general correction recommendation process is more likely to recommend corrections related to the accepted correction recommendations in future instances and may change the correction action used as part of making the correction recommendation (e.g., perform automatic correction with highlighting instead of suggesting the correction based on determining that a particular type of correction recommendation has been accepted at higher than a threshold rate).

The system 200 also may consider statistics within the accepted correction recommendations in adjusting the general correction recommendation process. For instance, the system 200 may only make adjustments when correction recommendations are accepted over a threshold rate (e.g., 50 or 75%). The system 200 also may use the statistics to adjust weightings applied to different correction recommendation in assessing user corrections such that the system 200 may update the process more heavily for more commonly accepted correction recommendations than for correction recommendations that are accepted at a lower rate. The system 200 also may store the accepted correction recommendations as data leveraged by the general correction recommendation process in performing correction recommendations. In this regard, the system 200 may compare a potential correction recommendation to the stored accepted correction recommendations, suggest the potential correction recommendation if the potential correction recommendation is the same as or similar to a previously accepted correction recommendation, and determine not to suggest the potential correction recommendation if the potential correction recommendation is not the same as or similar to a previously accepted correction recommendation.

For the rejected correction recommendations, the system 200 uses a similar process for updating the general correction recommendation process, but does so to reduce the likelihood that rejected correction recommendations are repeated. For instance, the system 200 may update the process by increasing weightings or rules to make it less likely to recommend the types of corrections associated with rejected corrections. In this regard, the system 200 may update the general correction recommendation process in a manner that will decrease the correction probability score when it encounters similar types of potential correction recommendations in future instances. With a decreased correction probability score, the updated general correction recommendation process is less likely to recommend corrections related to the rejected correction recommendations in future instances and may change the correction action used as part of making the correction recommendation (e.g., suggest the correction perform instead of performing automatic correction with highlighting based on determining that a particular type of correction recommendation has been rejected at higher than a threshold rate).

The system 200 also may consider statistics within the rejected correction recommendations in adjusting the general correction recommendation process. For instance, the system 200 may only make adjustments when correction recommendations are rejected over a threshold rate (e.g., 50 or 75%). The system 200 also may use the statistics to adjust weightings applied to different correction recommendations in assessing user corrections such that the system 200 may update the process more heavily for more commonly rejected correction recommendations than for correction recommendations that are rejected at a lower rate. The system 200 also may store the rejected correction recommendations as data leveraged by the general correction recommendation process in performing correction recommendations. In this regard, the system 200 may compare a potential correction recommendation to the stored rejected correction recommendations, suggest the potential correction recommendation if the potential correction recommendation is not the same as or similar to a previously rejected correction recommendation, and determine not to suggest the potential correction recommendation if the potential correction recommendation is the same as or similar to a previously rejected correction recommendation.

The system 200 also may consider accepted and rejected correction recommendations together as part of the general correction recommendation process. For example, the system 200 may compare a potential correction recommendation to the stored accepted and rejected correction recommendations, suggest the potential correction recommendation with a first type of correction action (e.g., automatic correction) if the potential correction recommendation is the same as or similar to a previously accepted correction recommendation, suggest the potential correction recommendation with a second type of correction action that is less certain than the first type of correction action (e.g., suggest the correction for user consideration) if the potential correction recommendation is not the same as or similar to a previously accepted or previously rejected correction recommendation, and determine not to suggest the potential correction recommendation if the potential correction recommendation is the same as or similar to a previously rejected correction recommendation.

In some implementations, the system 200 may use machine learning to update the general correction recommendation process based on the accepted and rejected correction recommendations. In these implementations, the system 200 may input the accepted and rejected correction recommendations and/or any statistics generated from the accepted and rejected correction recommendations into a machine learning process that tunes the general correction recommendation process. The system 200 may apply the accepted and rejected correction recommendations to a language model that learns how users accept and reject correction recommendations to improve its processes for performing automatic correction recommendations.

In some examples, the system 200 updates context data based on the accepted and/or rejected correction recommendations. In these examples, the system 200 may use the accepted and/or rejected correction recommendations to update context data related to corrections made by other users that the general correction recommendation process considers in assessing correction recommendations. The system 200 also may consider context related to accepted and/or rejected correction recommendations to consider when it is more likely that a user accepts or rejects a correction recommendation. The system 200 may adjust weightings or rules related to how context influences the correction probability score based on the context related to accepted and/or rejected correction recommendations. For instance, when a particular context factor is associated with a high rate of accepted correction recommendations, the system 200 adjusts the weighting given to the particular context factor such that its presence increases the likelihood that the correction recommendation will be provided and/or increases the certainty for the correction action that is used to present the correction recommendations. Alternatively, when the particular context factor is associated with a high rate of rejected correction recommendations, the system 200 adjusts the weighting given to the particular context factor such that its presence decreases the likelihood that the correction recommendation will be provided and/or decreases the certainty for the correction action that is used to present the correction recommendations.

The system 200 also analyzes the first and/or second data as feedback to update a user-specific correction recommendation process (760). For example, the system 200 analyzes a subset of the first and second data related to accepted and rejected correction recommendations as part of a process to update the user-specific correction recommendation process. In this example, the system 200 considers the subset of the first and second data because the update is for a user-specific correction recommendation process that is speaker dependent. By considering the subset of the data, the system 200 updates the user-specific correction recommendation process in a manner that is best suited for a particular user and considers the acceptances and rejections made by the specific user or users that are in a similar group as the specific user. In this regard, the system 200 may identify the subset of the first and second data by selecting only the accepted and rejected correction recommendations provided by the specific user. The system 200 also may consider groups of users that have similar attributes as the specific user (e.g., live in the same geographic region, have the same interests, etc.) and consider the accepted and rejected correction recommendations provided by the groups of users that have similar attributes in updating the user-specific correction recommendation process that is used for the specific user.

In some implementations, the user-specific correction recommendation process may be a group-specific speech-to-text conversion process that applies to a group of users. In these implementations, the system 200 tailors the group-specific correction recommendation process to be used by a group of users that have similar attributes (e.g., live in the same geographic region, have the same interests, etc.).

The system 200 updates the user-specific correction recommendation process using similar techniques described above for updating the general correction recommendation process, but tailors the updates to the specific user or group of users. For example, the system 200 updates the user-specific correction recommendation process by tailoring it to provide correction recommendations related to the user's accepted correction recommendations and to avoid correction recommendations related to the user's rejected correction recommendations. For the accepted correction recommendations, the system 200 identifies common corrections made by the user and adjusts the process to suggest those types of corrections in future instances. The system 200 may update the process by increasing weightings or rules to make it more likely to recommend the types of corrections associated with the user's accepted corrections. In this regard, the system 200 may update the user-specific correction recommendation process in a manner that will increase the correction probability score when it encounters similar types of potential correction recommendations in future instances. With an increased correction probability score, the updated user-specific correction recommendation process is more likely to recommend corrections related to the user's accepted correction recommendations in future instances and may change the correction action used as part of making the correction recommendation to the user (e.g., perform automatic correction with highlighting instead of suggesting the correction based on determining that a particular type of correction recommendation has been accepted by the user at higher than a threshold rate).

The system 200 also may consider statistics within the user's accepted correction recommendations in adjusting the user-specific correction recommendation process. For instance, the system 200 may only make adjustments when correction recommendations are accepted by the user over a threshold rate (e.g., 50 or 75%). The system 200 also may use the statistics to adjust weightings applied to different correction recommendation in assessing the user's corrections such that the system 200 may update the process more heavily for more commonly accepted correction recommendations than for correction recommendations that are accepted at a lower rate by the user. The system 200 also may store the user's accepted correction recommendations as data leveraged by the user-specific correction recommendation process in performing correction recommendations for the user. In this regard, the system 200 may compare a potential correction recommendation to the user's accepted correction recommendations, suggest the potential correction recommendation if the potential correction recommendation is the same as or similar to a previously accepted correction recommendation, and determine not to suggest the potential correction recommendation if the potential correction recommendation is not the same as or similar to a previously accepted correction recommendation.

For the rejected correction recommendations, the system 200 uses a similar process for updating the user-specific correction recommendation process, but does so to reduce the likelihood that rejected correction recommendations are repeated. For instance, the system 200 may update the process by increasing weightings or rules to make it less likely to recommend the types of corrections associated with the user's rejected corrections. In this regard, the system 200 may update the user-specific correction recommendation process in a manner that will decrease the correction probability score when it encounters similar types of potential correction recommendations in future instances. With a decreased correction probability score, the updated user-specific correction recommendation process is less likely to recommend corrections related to the rejected correction recommendations in future instances and may change the correction action used as part of making the correction recommendation to the user (e.g., suggest the correction perform instead of performing automatic correction with highlighting based on determining that a particular type of correction recommendation has been rejected by the user at higher than a threshold rate).

The system 200 also may consider statistics within the user's rejected correction recommendations in adjusting the user-specific correction recommendation process. For instance, the system 200 may only make adjustments when correction recommendations are rejected by the user over a threshold rate (e.g., 50 or 75%). The system 200 also may use the statistics to adjust weightings applied to different correction recommendations in assessing the user's corrections such that the system 200 may update the process more heavily for more commonly rejected correction recommendations than for correction recommendations that are rejected by the user at a lower rate. The system 200 also may store the rejected correction recommendations as data leveraged by the user-specific correction recommendation process in performing correction recommendations. In this regard, the system 200 may compare a potential correction recommendation to the user's rejected correction recommendations, suggest the potential correction recommendation if the potential correction recommendation is not the same as or similar to a previously rejected correction recommendation, and determine not to suggest the potential correction recommendation if the potential correction recommendation is the same as or similar to a previously rejected correction recommendation.

The system 200 also may consider accepted and rejected correction recommendations together as part of the user-specific correction recommendation process. For example, the system 200 may compare a potential correction recommendation to the user's accepted and rejected correction recommendations, suggest the potential correction recommendation with a first type of correction action (e.g., automatic correction) if the potential correction recommendation is the same as or similar to a previously accepted correction recommendation, suggest the potential correction recommendation with a second type of correction action that is less certain than the first type of correction action (e.g., suggest the correction for user consideration instead of automatic correction) if the potential correction recommendation is not the same as or similar to a previously accepted or previously rejected correction recommendation, and determine not to suggest the potential correction recommendation if the potential correction recommendation is the same as or similar to a previously rejected correction recommendation.

In some implementations, the system 200 may use machine learning to update the user-specific correction recommendation process based on the user's accepted and rejected correction recommendations. In these implementations, the system 200 may input the user's accepted and rejected correction recommendations and/or any statistics generated from the user's accepted and rejected correction recommendations into a machine learning process that tunes the user-specific correction recommendation process. The system 200 may apply the user's accepted and rejected correction recommendations to a language model that learns how the user accepts and rejects correction recommendations to improve its processes for performing automatic correction recommendations for the user.

In some examples, the system 200 updates context data for the user based on the user's accepted and/or rejected correction recommendations. In these examples, the system 200 may use the user's accepted and/or rejected correction recommendations to update context data related to corrections made by the user. The system 200 also may consider context related to the user's accepted and/or rejected correction recommendations to consider when it is more likely that the user accepts or rejects a correction recommendation. The system 200 may adjust weightings or rules related to how context influences the correction probability score based on the context related to the user's accepted and/or rejected correction recommendations. For instance, when a particular context factor is associated with a high rate of accepted correction recommendations by the user, the system 200 adjusts the weighting given to the particular context factor such that its presence increases the likelihood that the correction recommendation will be provided to the user and/or increases the certainty for the correction action that is used to present the correction recommendation to the user. Alternatively, when the particular context factor is associated with a high rate of rejected correction recommendations by the user, the system 200 adjusts the weighting given to the particular context factor such that its presence decreases the likelihood that the correction recommendation will be provided to the user and/or decreases the certainty for the correction action that is used to present the correction recommendation to the user.

The system 200 performs speech-to-text conversion and correction recommendation based on the updated processes (770). For instance, the system 200 uses the updated processes for speech-to-text conversion and correction recommendation to provide speech-to-text conversion for future voice input and future correction recommendations responsive to user edits to converted text.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A cellular phone configured to perform automated dictation correction, the cellular phone comprising:
   a touch-sensitive display configured to display text and detect touch input;
   a microphone configured to receive voice input provided to the microphone;
   one or more processors; and
   one or more computer-readable media storing instructions that, when executed, cause at least one of the one or more processors to perform operations comprising:
      receiving voice input of one or more sentences spoken by a user and captured by the microphone;
      converting the received voice input of the one or more sentences to text data representing the one or more sentences;
      causing display, on the touch-sensitive display, of the text data representing the one or more sentences converted from the received voice input;
      subsequent to display, on the touch-sensitive display, of the text data representing the one or more sentences, receiving a text correction of a first portion of the text data representing the one or more sentences, the text correction being entered by the user through touch input detected by the touch-sensitive display and resulting in a change from the first portion of the text data to corrected text within the one or more sentences displayed on the touch-sensitive display;
      based on receipt of the text correction of the first portion of the text data, analyzing the text data representing the one or more sentences to assess similarity of the first portion of the text data to other portions of the text data representing the one or more sentences;
      based on the assessment of the similarity of the first portion of the text data to other portions of the text data representing the one or more sentences, determining that an additional correction of a second portion of the text data representing the one or more sentences is recommended, the second portion of the text data representing a different part of the one or more sentences than the first portion of the text data; and
      based on the determination that the additional correction of the second portion of the text data representing the one or more sentences is recommended, performing an operation related to automated correction of the second portion of the text data representing the one or more sentences,
   wherein analyzing the text data representing the one or more sentences to assess similarity of the first portion of the text data to other portions of the text data representing the one or more sentences comprises evaluating context of the text correction in assessing similarity of the first portion of the text data to other portions of the text data, and
   wherein evaluating context of the text correction in assessing similarity of the first portion of the text data to other portions of the text data comprises:
      determining a part of speech of the first portion of the text data;
      determining parts of speech of the other portions of the text data;
      evaluating the part of speech of the first portion of the text data against the parts of speech of the other portions of the text data to assess similarity;
      evaluating grammatical correctness of the other portions of the text data when left uncorrected; and
      evaluating grammatical correctness of the other portions of the text data when corrected based on the correction recommendation.

2. The cellular phone of claim 1, wherein performing the operation related to automated correction of the second portion of the text data representing the one or more sentences comprises automatically correcting the second portion of the text data representing the one or more sentences based on the additional correction recommended.

3. The cellular phone of claim 2, wherein automatically correcting the second portion of the text data representing the one or more sentences based on the additional correction recommended comprises displaying an indication that indicates that the second portion of the text data representing the one or more sentences has been automatically corrected.

4. The cellular phone of claim 2, wherein automatically correcting the second portion of the text data representing the one or more sentences based on the additional correction recommended comprises:
   providing a limited time option to revert the automatic correction back to the second portion of the text data;
   reverting the automatic correction back to the second portion of the text data based on user selection of the limited time option within the limited time; and
   maintaining the automatic correction based on expiration of the limited time without user selection of the limited time option.

5. The cellular phone of claim 1, wherein performing the operation related to automated correction of the second portion of the text data representing the one or more sentences comprises displaying a suggestion to make the additional correction of the second portion of the text data representing the one or more sentences,
   wherein displaying the suggestion to make the additional correction of the second portion of the text data representing the one or more sentences comprises displaying the suggestion to make the additional correction of the second portion of the text data representing the one or more sentences with at least one control that allows the user to accept or reject the additional correction of the second portion of the text data representing the one or more sentences.

6. The cellular phone of claim 1, wherein analyzing the text data representing the one or more sentences to assess similarity of the first portion of the text data to other portions of the text data representing the one or more sentences comprises identifying portions of the text data of similar length to the first portion of the text data and comparing the first portion of the text data to the identified portions of text data to assess similarity of the first portion of the text data to each of the identified portions of text data.

7. The cellular phone of claim 1, wherein analyzing the text data representing the one or more sentences to assess similarity of the first portion of the text data to other portions of the text data representing the one or more sentences comprises reevaluating the voice input with the text correction as an input considered in conversion of the voice input corresponding to the other portions of the text data.

8. The cellular phone of claim 1, wherein evaluating context of the text correction in assessing similarity of the first portion of the text data to other portions of the text data comprises evaluating prior text entered by the user without voice and weighting a correction recommendation more heavily based on the correction recommendation matching the prior text entered by the user without voice.

9. The cellular phone of claim 1, wherein evaluating context of the text correction in assessing similarity of the first portion of the text data to other portions of the text data comprises evaluating surrounding text that was not corrected and weighting a correction recommendation more heavily based on the correction recommendation matching the surrounding text that was not corrected.

10. The cellular phone of claim 1, wherein evaluating context of the text correction in assessing similarity of the first portion of the text data to other portions of the text data comprises:
    accessing, from a server, correction data representing text corrections made by other users;
    evaluating the text corrections made by the other users; and
    weighting a correction recommendation more heavily based on the correction recommendation matching at least one of the text corrections made by the other users.

11. The cellular phone of claim 1:
    wherein analyzing the text data representing the one or more sentences to assess similarity of the first portion of the text data to other portions of the text data representing the one or more sentences comprises:
       comparing the first portion of the text data to the other portions of text data to assess similarity of the first portion of the text data to each of the other portions of text data,
       reevaluating the voice input with the text correction as an input considered in conversion of the voice input corresponding to the other portions of the text data, and
       determining a correction probability score based on the comparison of the first portion of the text data to the other portions of text data, the reevaluation of the voice input with the text correction as an input, and the evaluation of the context;
    wherein determining that the additional correction of the second portion of the text data representing the one or more sentences is recommended comprises:
       accessing, from electronic storage, data relating correction actions to ranges of correction probability scores,
       comparing the determined correction probability score to the ranges of correction probability scores, and
       selecting a correction action based on the comparison of the determined correction probability score to the ranges of correction probability scores; and
    wherein performing the operation related to automated correction of the second portion of the text data representing the one or more sentences comprises performing the selected correction action.

12. The cellular phone of claim 11, wherein accessing, from electronic storage, data relating correction actions to ranges of correction probability scores comprises accessing a table that maps a first correction action of automatically correcting text without highlighting to a first range of correction probability scores, a second correction action of automatically correcting text with highlighting to a second range of correction probability scores, a third correction action of suggesting a text correction with a correct all option to a third range of correction probability scores, a fourth correction action of suggesting a text correction with a single option for corrected text to a fourth range of correction probability scores, a fifth correction action of suggesting a text correction with multiple options for corrected text to a fifth range of correction probability scores, and a sixth correction action of highlighting text with an indication that original text is being maintained to a sixth range of correction probability scores, the first, second, third, fourth, fifth, and sixth ranges of correction probability scores each being different from one another.

13. The cellular phone of claim 1, wherein the operations further comprise:
- accessing first data related to accepted correction recommendations;
- accessing second data related to rejected correction recommendations;
- analyzing the first and second data as feedback to update a general speech-to-text conversion process;
- analyzing the first and second data as feedback to update a user-specific speech-to-text conversion process; and
- performing speech-to-text conversion based on the updated general and user-specific speech-to-text conversion processes.

14. The cellular phone of claim 13:
- wherein analyzing the first and second data as feedback to update the general speech-to-text conversion process comprises:
  - adding a first acronym to a first database of available words used by the general speech-to-text conversion process based on detecting that a threshold number of users have accepted correction recommendations that change text to the first acronym that was not previously stored in the first database of available words used by the general speech to text conversion process,
  - adjusting how the general speech-to-text conversion process maps different sounds to different words in performing speech-to-text conversion based on the first and second data; and
  - using statistics from the first and second data to adjust weightings applied to different mappings in assessing speech input by the general speech-to-text conversion process such that the general speech-to-text conversion process is updated more heavily for correction recommendations accepted at a higher rate than for correction recommendations that are accepted at a lower rate; and
- wherein analyzing the first and second data as feedback to update the user-specific speech-to-text conversion process comprises:
  - identifying a subset of the first and second data that pertains to a user associated with the user-specific speech-to-text conversion process;
  - adding a second acronym to a second database of available words used by the user-specific speech-to-text conversion process based on detecting that the user has accepted correction recommendations over a threshold number of times that change text to the second acronym that was not previously stored in the second database of available words used by the user-specific speech to text conversion process,
  - adjusting how the user-specific speech-to-text conversion process maps different sounds to different words in performing speech-to-text conversion based on the subset of the first and second data; and
  - using statistics from the subset of the first and second data to adjust weightings applied to different mappings in assessing speech input by the user-specific speech-to-text conversion process such that the user-specific speech-to-text conversion process is updated more heavily for correction recommendations accepted by the user at a higher rate than for correction recommendations that are accepted by the user at a lower rate.

15. The cellular phone of claim 1, wherein the operations further comprise:
- accessing first data related to accepted correction recommendations;
- accessing second data related to rejected correction recommendations;
- analyzing the first and second data as feedback to update a general correction recommendation process;
- analyzing the first and second data as feedback to update a user-specific correction recommendation process; and
- performing correction recommendation based on the updated general and user-specific correction recommendation processes.

16. The cellular phone of claim 15:
- wherein analyzing the first and second data as feedback to update the general correction recommendation process comprises:
  - updating the general correction recommendation process in a manner that will increase a general correction probability score generated by the general correction recommendation process based on detecting a general potential correction recommendation that matches accepted correction recommendations from the first data;
  - updating the general correction recommendation process in a manner that will decrease the general correction probability score generated by the general correction recommendation process based on detecting the general potential correction recommendation that matches rejected correction recommendations from the second data;
  - changing a correction action used by the general correction recommendation process as part of making a correction recommendation based on the first and second data;
  - storing accepted correction recommendations from the first data and rejected correction recommendations from the second data as data leveraged by the general correction recommendation process in performing correction recommendations;
  - updating context data used by the general correction recommendation process based on the first and second data; and
  - adjusting weightings related to how context influences the general correction probability score generated by the general correction recommendation process based on context related to the first and second data; and
- wherein analyzing the first and second data as feedback to update the user-specific correction recommendation process comprises:
  - identifying a subset of the first and second data that pertains to a user associated with the user-specific correction recommendation process;
  - updating the user-specific correction recommendation process in a manner that will increase a user-specific correction probability score generated by the user-specific correction recommendation process based on detecting a user-specific potential correction recommendation that matches accepted correction recommendations from the subset of the first data;
  - updating the user-specific correction recommendation process in a manner that will decrease the user-specific correction probability score generated by the general correction recommendation process based on detecting the user-specific potential correction recommendation that matches rejected correction recommendations from the subset of the second data;

changing a correction action used by the user-specific correction recommendation process as part of making a correction recommendation based on the subset of the first and second data;

storing accepted correction recommendations from the subset of the first data and rejected correction recommendations from the subset of the second data as data leveraged by the user-specific correction recommendation process in performing correction recommendations for the user;

updating user-specific context data used by the user-specific correction recommendation process based on the subset of the first and second data; and adjusting weightings related to how context influences the user-specific correction probability score generated by the user-specific correction recommendation process based on context related to the subset of the first and second data.

17. The cellular phone of claim 1, wherein the operations further comprise applying the text correction to a machine learning process that is used to update a language model that is used in speech-to-text conversion.

18. The cellular phone of claim 1, further comprising:
an analog to digital converter configured to take sounds from an audio input captured by the microphone, measure waves in the audio input captured by the microphone, and filter the waves to distinguish relevant sounds in the audio input captured by the microphone;
wherein converting the received voice input of the one or more sentences to text data representing the one or more sentences comprises:
matching the relevant sounds distinguished by the analog to digital converter to phonemes, and
using a mathematical model to compare the matching phonemes to known sentences, words, and phrases to identify the text data representing the one or more sentences.

19. A cellular phone configured to perform automated dictation correction, the cellular phone comprising:
a touch-sensitive display configured to display text and detect touch input;
a microphone configured to receive voice input provided to the microphone;
one or more processors; and
one or more computer-readable media storing instructions that, when executed, cause at least one of the one or more processors to perform operations comprising:
receiving voice input of one or more sentences spoken by a user and captured by the microphone;
converting the received voice input of the one or more sentences to text data representing the one or more sentences;
causing display, on the touch-sensitive display, of the text data representing the one or more sentences converted from the received voice input;
subsequent to display, on the touch-sensitive display, of the text data representing the one or more sentences, receiving a text correction of a first portion of the text data representing the one or more sentences, the text correction being entered by the user through touch input detected by the touch-sensitive display and resulting in a change from the first portion of the text data to corrected text within the one or more sentences displayed on the touch-sensitive display;

based on receipt of the text correction of the first portion of the text data, analyzing the text data representing the one or more sentences to assess similarity of the first portion of the text data to other portions of the text data representing the one or more sentences;

based on the assessment of the similarity of the first portion of the text data to other portions of the text data representing the one or more sentences, determining that an additional correction of a second portion of the text data representing the one or more sentences is recommended, the second portion of the text data representing a different part of the one or more sentences than the first portion of the text data; and based on the determination that the additional correction of the second portion of the text data representing the one or more sentences is recommended, performing an operation related to automated correction of the second portion of the text data representing the one or more sentences, wherein analyzing the text data representing the one or more sentences to assess similarity of the first portion of the text data to other portions of the text data representing the one or more sentences comprises evaluating context of the text correction in assessing similarity of the first portion of the text data to other portions of the text data, and wherein evaluating context of the text correction in assessing similarity of the first portion of the text data to other portions of the text data comprises:
accessing a profile of the user;
evaluating the profile of the user in assessing similarity;
weighting a correction recommendation more heavily based on the correction recommendation matching the profile of the user;
identifying an interest in the profile of the user; and
selecting a database of acronyms used in making the correction recommendation based on the identified interest in the profile of the user.

20. A cellular phone configured to perform automated dictation correction, the cellular phone comprising:
a touch-sensitive display configured to display text and detect touch input;
a microphone configured to receive voice input provided to the microphone;
a Global Positioning System (GPS) sensor configured to sense a current location of the cellular phone;
one or more processors; and
one or more computer-readable media storing instructions that, when executed, cause at least one of the one or more processors to perform operations comprising:
receiving voice input of one or more sentences spoken by a user and captured by the microphone;
converting the received voice input of the one or more sentences to text data representing the one or more sentences;
causing display, on the touch-sensitive display, of the text data representing the one or more sentences converted from the received voice input;
subsequent to display, on the touch-sensitive display, of the text data representing the one or more sentences, receiving a text correction of a first portion of the text data representing the one or more sentences, the text correction being entered by the user through touch input detected by the touch-sensitive display and resulting in a change from the first portion of the text data to corrected text within the one or more sentences displayed on the touch-sensitive display;

based on receipt of the text correction of the first portion of the text data, analyzing the text data representing the one or more sentences to assess similarity of the first portion of the text data to other portions of the text data representing the one or more sentences;

based on the assessment of the similarity of the first portion of the text data to other portions of the text data representing the one or more sentences, determining that an additional correction of a second portion of the text data representing the one or more sentences is recommended, the second portion of the text data representing a different part of the one or more sentences than the first portion of the text data; and based on the determination that the additional correction of the second portion of the text data representing the one or more sentences is recommended, performing an operation related to automated correction of the second portion of the text data representing the one or more sentences, wherein analyzing the text data representing the one or more sentences to assess similarity of the first portion of the text data to other portions of the text data representing the one or more sentences comprises evaluating context of the text correction in assessing similarity of the first portion of the text data to other portions of the text data, and wherein evaluating context of the text correction in assessing similarity of the first portion of the text data to other portions of the text data comprises:

determining a timing for the text correction;

evaluating the timing for the text correction in assessing similarity;

determining a location for the text correction based on the current location of the cellular phone sensed by the GPS sensor;

determining an accent associated with the location for the text correction;

selecting a database of acronyms used in making the correction recommendation based on the location for the text correction; and evaluating the location for the text correction in assessing similarity based on the determined accent and the selected database of acronyms.

\* \* \* \* \*